United States Patent
Nakahara

(10) Patent No.: US 8,384,934 B2
(45) Date of Patent: Feb. 26, 2013

(54) IMAGE PROCESSING APPARATUS AND METHOD THEREOF

(75) Inventor: Hidetaka Nakahara, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 968 days.

(21) Appl. No.: 12/338,689

(22) Filed: Dec. 18, 2008

(65) Prior Publication Data

US 2009/0251738 A1    Oct. 8, 2009

(30) Foreign Application Priority Data

Dec. 20, 2007    (JP) ................................. 2007-328727

(51) Int. Cl.
*G06F 3/00*    (2006.01)

(52) U.S. Cl. ......................... 358/1.15; 358/1.14; 710/36

(58) Field of Classification Search .................. None
See application file for complete search history.

(56) References Cited

U.S. PATENT DOCUMENTS

| | | | |
|---|---|---|---|
| 2002/0024685 A1 | 2/2002 | Sasaki | |
| 2005/0108353 A1 | 5/2005 | Yamamoto | |
| 2006/0173904 A1* | 8/2006 | Nakajima | 707/102 |
| 2006/0190496 A1* | 8/2006 | Tsunoda | 707/200 |
| 2007/0089173 A1 | 4/2007 | Hikichi | |
| 2008/0049248 A1* | 2/2008 | Sasaki et al. | 358/1.15 |

FOREIGN PATENT DOCUMENTS

| | | |
|---|---|---|
| CN | 1941824 A | 4/2007 |
| JP | 2005-149320 A | 6/2005 |

* cited by examiner

*Primary Examiner* — Twyler Haskins
*Assistant Examiner* — Lennin Rodriguez
(74) *Attorney, Agent, or Firm* — Canon USA, Inc., I.P. Division

(57) ABSTRACT

An image processing apparatus, which includes an input unit configured to input image data and which is communicably connected to multiple external apparatuses via a network, which obtains a document with a predetermined form via the network from one of the multiple external apparatuses and transmits the image data input by the input unit according to instructions from a user based on the predetermined form. Also, in the case that the predetermined form described in the obtained document is recognized as a form to request input of image data, determines whether transmission of the image data should be restricted according to transmission destination of the image data transmitted, and based on the determining results, a control unit restricts transmission of the image data.

9 Claims, 19 Drawing Sheets

```
1  <html>
2      <head>
3          <title>APPLICATION</title>
4      </head>
5      <body>
6          <h1>PLEASE SEND APPLICATION</h1>
7          <form enctype="multipart/form-data"method="post"action="regist.cgi">
8              <input type="file"name="userFile">
9              <input type="submit"value="SEND">
10         </form>
11     </body>
12 </html>
```

| SERVERS WITH TRANSMISSION RESTRICTIONS |
|---|
| 111.111.111.111 |
| 111.111.111.222 |
| 111.111.111.333 |

| SERVERS WITH TRANSMISSION RESTRICTIONS | RANGE OF RESTRICTIONS | |
|---|---|---|
| | USER A | USER B |
| 111.111.111.111 | ALL | BOX |
| 111.111.111.222 | ALL | SCANNER |
| 111.111.111.333 | SCANNER | ALL |

IMAGE PROCESSING APPARATUS AND METHOD THEREOF

BACKGROUND OF THE INVENTION

1. Field of the Invention

The present invention relates to an image processing apparatus which is communicably connected to an external apparatus via a network.

2. Description of the Related Art

With HTML (HyperText Markup Language), a web page creator can request input of information as to a user viewing the web page with a form that is described with predetermined form elements. An HTML form is an effective tool for various types of applications which require input from users, and makes up a user interface between the web page creator and the user. Thus, a web application is provided which operates on the web server side and can be operated from the web browser of a client.

The web browser of the user which is the client requests HTML resources as to a web browser, and upon obtaining from the server, a user interface based on HTML is displayed on the web browser of the client. When the user inputs information in the form displayed on the web browser and confirms this, the input information is transmitted from the client to the server. Information replied as to the input information, i.e. content wherein execution results of the web application are reflected, can then be obtained from the server. In many cases, the replied content is a user interface of the web application made up with the HTML form. With repeating thus, a so-called distributed application system which is a web application operated on a server at a distant location that is operated by a user interface transmitted on the web browser of the client, is realized.

A great number of systems have realized HTML, which has bidirectionality of information transmissions, to be employed as a user interface description language which can be transferred distantly over a user interface by using forms.

A method for "file upload based on HTML form" is disclosed in RFC 1867. This method expands the bidirectionality of the information transmission by the HTML forms and enables uploading a file stored in a client platform as input as to the server of the distributed application. According to this method, a general web browser currently employed and a large amount of web content are installed.

An example of a screen of a form displayed on a general web browser by the technique shown in RFC 1867 is shown in FIG. 24. A screen 2401 in this form is generated based on an HTML document in later-described FIG. 10, and is displayed on a content display region 905 in the later-described web browser. In this screen, a display 2402 corresponds to an hi element in the 6th row in FIG. 10, and the region surrounded with a line in a display 2403 corresponds to an "input" element in "file" form in the 8th row in FIG. 10. Also, a display 2404 corresponds to the "input" element of a "submit" form of the 9th row in FIG. 10.

Within the display 2403 region is an implementation by a method generally employed with a conventional web browser, and this implementation is also shown in the RFC 1867. Within the display 2403 region, the display 2405 is a file name input field, wherein a file path (file name) in a file system of the file to be uploaded to the server can be input by typing. Also, a display 2406 corresponds to a file selection button, and when this button is pressed, the web browser can enter a file selection mode applicable to the operating platform. With a web browser operated on a general-use computer, a file selection dialog box is opened, whereby the file to be uploaded from the group of files stored in the file system can be selected.

On the other hand, in accordance with the development and wide-spread use of Internet technology, a wide variety of distribution application services are being provided which presume the generally-used web browser to be the client. In particular, in the field of information technology, application service providers (ASP) which are vendors specializing in providing web-based distributed applications have begun providing services. Services provided by an ASP include information service, creating, searching, storing, authentication, distribution, printing, publishing, managing, translating, commissioning, and so forth. Also, governmental paperwork and various types of electronic business transactions may be offered.

Within the field of built-in systems also, a remote user interface is made into a product which a web server function is provided in addition to the original apparatus functions on an apparatus to provide a user interface of the apparatus to a distant web browser. Also, a technology is currently provided to the apparatus functions wherein a web client function is provided in addition to the original apparatus functions on an apparatus to obtain (download) various content from a distant web server and perform browsing. As an example of such an apparatus is an image processing apparatus with a built-in web browser.

If performing uploading of image data not digitized can be performed in the workflow of the distributed application provided by the ASP, the likelihood of a distributed application increases. For example, in a workflow for electronic business transactions or governmental paperwork, it is anticipated that input such as order forms with a seal or signature or public documents such as various types of identification certificates can be obtained at an appropriate timing during the paperwork process.

In the case that a system is made up by joining the web client corresponding to a general-use web application and an image input unit, the image data input with the image processing apparatus has to be stored in a storage unit such as an HD. Subsequently, the file thereof is uploaded, resulting in two operations being performed. That is to say, there is a problem wherein the two steps of an image input step and an upload step are required, and accordingly, the operation thereof becomes cumbersome.

To solve this problem, there is a technique to use a web browser built in to the image processing apparatus to readily perform uploading of image data not digitized (e.g. Japanese Patent Laid-Open No. 2005-149320). As a screen based on description of an "input" element in "file" form, displaying a button to read an image on an original image, input the image data, and directly upload the input image data, is described in Japanese Patent Laid-Open No. 2005-149320.

In accordance with developments in network technology such as described above, transmitting information in a simple and efficient manner has been enabled. However, on the reverse side, the problem of information leakage has become serious. Particularly in recent years, due to the enforcement of personal information protection laws, information is required to be handled discreetly.

With such background, for example, in the case of electronic mail, a technique to restrict email transmissions to a particular email address may be considered. Also, in the case of uploading a file using the above-described web application and so forth, information leakage is prevented by using a method described below.

For example, as one method to restrict transmission of information as to a web application, restricting access to a server itself which provides the web application may be considered. However, in this case, the server itself cannot be accessed, so the information that the web application provides to the client cannot be obtained by the user on the client side.

Also, specifying a URL corresponding to a page providing the user interface for file uploading without restricting access to the server itself, and restricting access to this URL, may also be considered. However, in this case, access to pages newly created on the web application cannot be restricted. Therefore, the problem of information leakage may occur.

SUMMARY OF THE INVENTION

The present invention has been made in light of the above-described problems, and provides for an image processing apparatus, and a control method, program, and storage medium thereof, to restrict transmitting image data based on a document that includes a predetermined form is described.

An image processing apparatus, which includes an input unit configured to input image data and which is communicably connected to multiple external apparatuses via a network, such image processing apparatus including an obtaining unit configured to obtain a document with a predetermined form via the network from one of the multiple external apparatuses; a recognizing unit configured to recognize that the predetermined form described in the document obtained by the obtaining unit is a form to request input of image data; a transmitting unit configured to transmit the image data input by the input unit according to instructions from a user based on the predetermined form; a determining unit configured to determine whether the transmission of the image data should be restricted according to the transmission destination of the image data transmitted by the transmitting unit, in the case that the recognizing unit recognizes that the predetermined form is a form to request input of image data; and a control unit configured to restrict transmission of the image data by the transmitting unit, based on determining results by the determining unit.

A method for controlling an image processing apparatus, which includes an input unit configured to input image data and which is communicably connected to a plurality of external apparatuses via a network, includes obtaining a document with a predetermined form via the network from one of the plurality of external apparatuses, recognizing that the predetermined form described in the document obtained by the obtaining process is a form to request input of image data, transmitting the image data input by the input unit according to instructions from a user based on the predetermined form, determining whether the transmission of the image data should be restricted according to transmission destination of the image data transmitted in the transmitting process, in the case that the recognizing process recognizes that the predetermined form is a form to request input of the image data, and restricting transmission of the image data in the transmitting process, based on determination results.

Further features and aspects of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention and, together with the description, serve to explain the principle of the invention.

DESCRIPTION OF THE EMBODIMENTS

Embodiments of the present invention will be described below.

Figure 1:
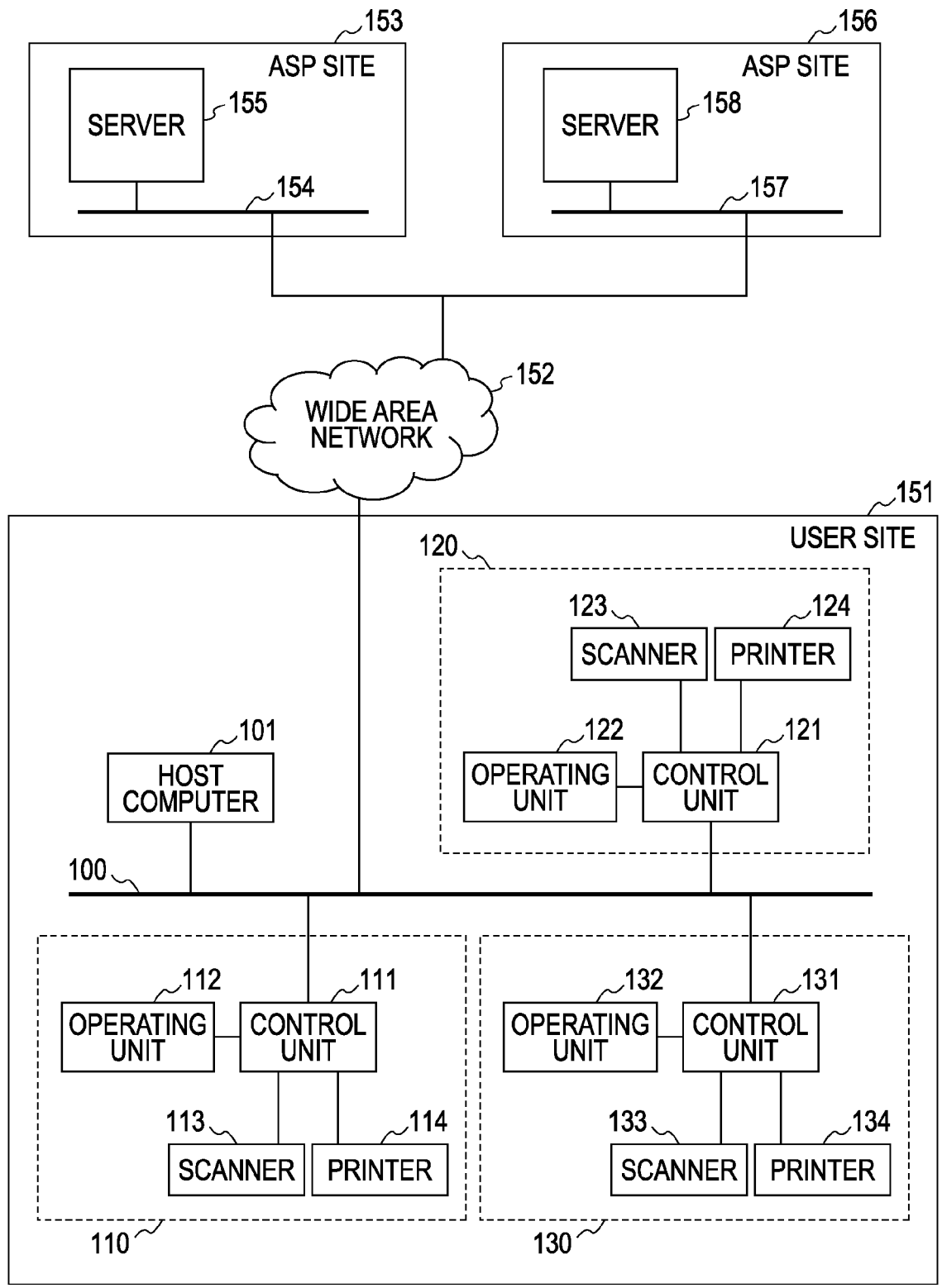
FIG. 1 is an overall system diagram according to an embodiment of the present invention.

FIG. 1 is a block diagram showing an overall configuration of a system including an image processing apparatus relating to a first embodiment of the present invention. As shown in FIG. 1, a system is made up of application server provider sites (hereafter called ASP sites) 153 and 156, wide area network 152, and user site 151. A wide area network 152 here refers to the Internet. Also, the wide area network 152 may be a virtual private network (VPN) on the Internet or a dedicated private network.

The ASP sites 153 and 156 provide a predetermined service to the user site 151 via the wide area network 152. Services provided by the ASP sites 153 and 156 may include information service, creating, searching, storing, authentication, distribution, printing, publishing, managing, translating, commissioning, and so forth. Also, governmental paperwork and various types of electronic business transactions may be offered. The ASP sites 153 and 156 include LANs (Local Area Network) 154 and 157, and servers 155 and 158. The LANs 154 and 157 are networks within the ASP sites 153 and 156, and connects network devices within the site. Also, the LANs 154 and 157 are connected to the wide area network 152 via a router or the like.

A software process group for realizing the service provided by the ASP operates on the servers 155 and 158. A software module may be
1) an HTTP server that transmits content such as HTML in response to a request by the HTTP protocol from the client,
2) a web application group which is executed with the HTTP server according to HTTP requests, performs predetermined processing and HTTP responses, and is installed with a CGI (Common Gateway Interfaces) program or servlet, and
3) a business logic group such as electronic business transaction program and backend database management system, used for a CGI program or servlet to execute predetermined processing.

The user site 151 is made up of a host computer 101, multiple network devices such as image processing apparatuses 110, 120, 130, and a LAN 100 to which the network device group is connected. The LAN 100 of the user site 151 is connected to the wide area network 152 via a router or the like. The router has a so-called firewall function. That is to say, the router performs packet filtering to protect the user site 151 from attacks by an external network. Also, with the router, there may be cases wherein network address conversions or network port conversions are performed for address management reasons and so forth.

Restrictions are placed on communication between the user site 151 and external network for such router functions. That is to say, in many cases, communication is enabled only for several defined protocols. For example, the HTTP connections established from inside toward the outside is generally permissible communication, and this is one reason that application service providing based on general web-based technology is valid.

The image processing apparatus 110 is an MFP (Multi Function Peripheral) that performs input/output and sending/receiving of an image and various types of image processing. The image processing apparatus 110 has a scanner 113 which is an image input device, printer 114 which is an image output device, control unit 111, and operating unit 112 which is a user interface. The scanner 113, printer 114, and operating unit 112 are each connected to the control unit 111, and are controlled by commands from the control unit 111. The control unit 111 is connected to the LAN 100.

Each of the image processing apparatuses 120 and 130 have similar device configurations as the image processing apparatus 110, and are similarly connected to the LAN 100, and communicably connected to the image processing apparatus 110 and ASP site 153. The image processing apparatus 120 has a scanner 123, printer 124, operating unit 122, and a control unit 121 which controls each of the scanner 123, printer 124, and operating unit 122. Also, the image processing apparatus 130 has a scanner 133, printer 134, operating unit 132, and a control unit 131 which controls each of the scanner 133, printer 134, and operating unit 132.

The host computer 101 is connected to the LAN 100. The host computer 101 has a web browser as described later, and displays status of the image processing apparatuses 110, 120, and 130, based on an HTML file received from the image processing apparatuses 110, 120, and 130. Also, the host computer 101 can perform HTTP connection to the servers 155 and 158 and receive service providing.

Figure 2:
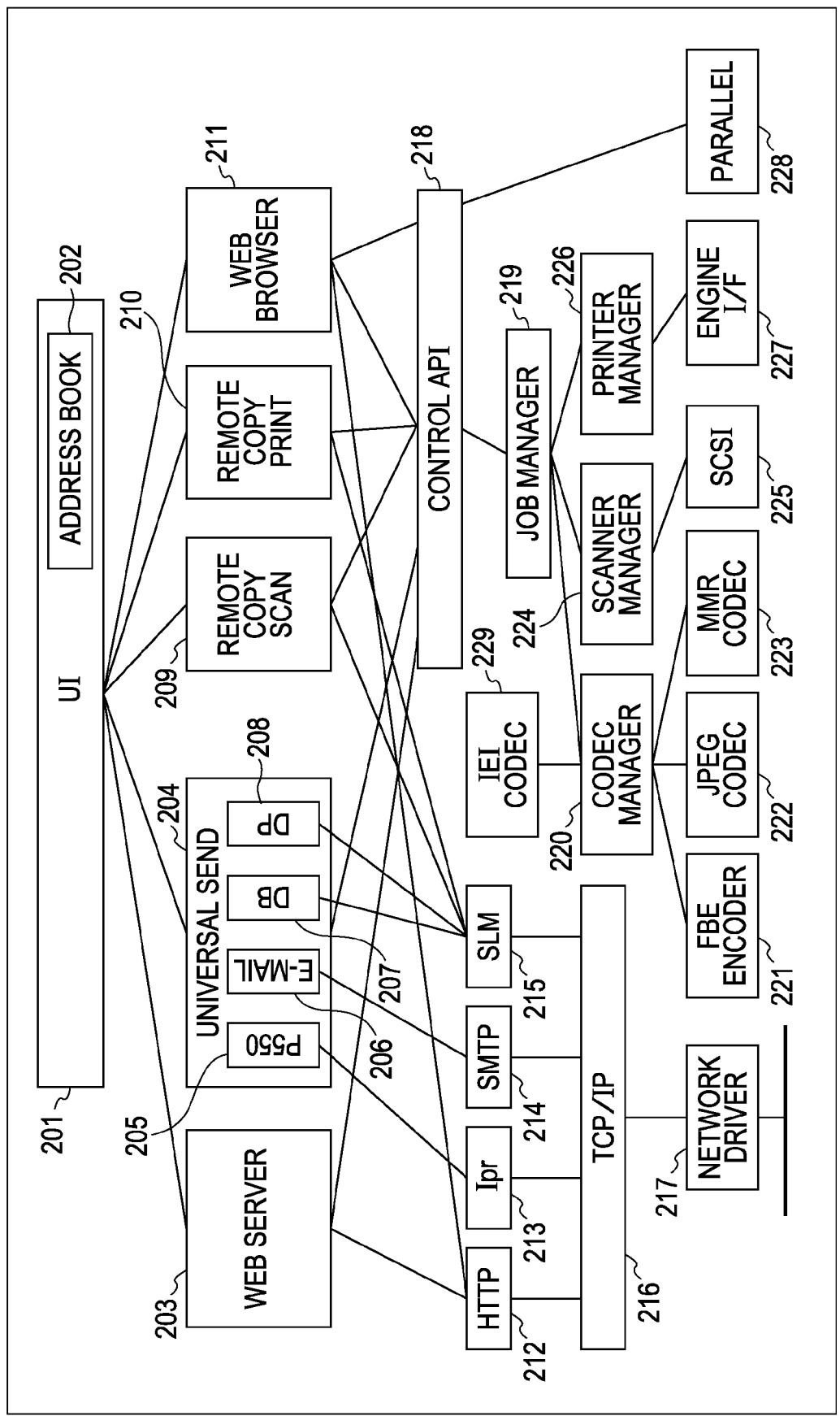
FIG. 2 is a software configuration diagram according to an embodiment of the present invention.

Next, the software configuration of the image processing apparatus 110 will be described with reference to FIG. 2. FIG. 2 is a block diagram illustrating the software configuration of the image processing apparatus 110 in FIG. 1. The software configuration of the various image processing apparatuses 110, 120, and 130 are the same, so will be described as the software configuration of the image processing apparatus 110.

A user interface (hereafter, UI) module 201 is implemented in the image processing apparatus 110. The UI module 201 is a module to perform mediation between a device and user operation in the event that an operator performs various types of operations/settings as to the image processing apparatus 110. In accordance with operator operations, the UI module 201 transfers input information to later-described various types of modules and requests processing, and performs data settings and so forth.

Also, an address book module 202 installed in the image processing apparatus 110, and the module 202 is a database module that manages data transmission destinations, communication destinations, and so forth. Regarding the data that the address book module 202 manages, adding, deleting, and obtaining data can be performed with operations from the UI module 201. Also, the address book module 202 data transmission/communication destination information to each module will be described later with operations by an operator.

Also, a web server module 203 notifies management information of the image processing apparatus 110 to a web client (e.g. host computer 101) based on a request from the web client. The above-described managing information is obtained via a later-described universal sending unit module 204, remote copy scan module 209, remote copy print module 210, and control API module 218. The managing information is communicated to the web client via a later-described HTTP module 212, TCP/IP communication module 216, and network driver 217.

Also, a web browser module 211 is installed in the image processing apparatus 110, and the module reads and displays information of various websites on the Internet or intranets. Details of the configuration of the web browser module 211 will be described later.

The universal sending unit (Universal-Send) module 204 is a module that governs data distribution, and the module 204 distributes data instructed by the operator via the UI module 201 to a similarly instructed communication (output) destination. Also, in the case that the scanner function of the present device is used by the operator to instruct generation of distribution data, the universal sending unit (Universal-Send) module 204 causes the device to operate via a control API module 218, and performs data generating. The universal sending unit module 204 has a module (P550) 205 to execute in the event that a printer is specified as the output destination and an e-mail module 206 to execute in the event that an e-mail address is specified as the communication destination. Further, the universal sending unit module 204 has a (DB) module 207 to execute in the event that a database is specified as the output destination and a (DP) module 208 to execute in the event that an image processing apparatus similar to the present device is specified as the output destination.

A remote copy scan module 209 uses the scanner function of the image processing apparatus 110 to read image information, and outputs the read image information to another image processing apparatus connected with a network or the like. Thus, the copy function realized with a single image processing apparatus is performed using another image processing apparatus.

The remote copy print module 210 uses the printer function of the main image processing apparatus 110 to output the image information obtained with the other image processing apparatus connected with a network or the like. Thus, the copy function realized with a single image processing apparatus is performed using another image processing apparatus.

An HTTP module 212 is used in the event of the image processing apparatus 110 performing communication by HTTP, and uses a later-described TCP/IP communication module 216 to provide a communication function to the web server module 203 or web browser module 211. Also, the module 212 provides a communication function corresponding to various types of protocol, particularly according to a protocol corresponding to security, used on the web beginning with HTTP.

Also, an lpr module 213 is implemented in the image processing apparatus 110, and this module uses the later-described TCP/IP communication module 216 to provide a communication function to the module 205 within the universal sending unit module 204.

Also, an SMTP module 214 is implemented in the image processing apparatus 110, and this module uses the later-described TCP/IP communication module 216 to provide a communication function to the E-mail module 206 within the universal send uniting module 204.

Also, a SLM (Salutation-Manager) module 215 uses the later-described TCP/IP communication module 216 to provide a communication function to the module 217 and module 218 within the universal sending unit module 204. The SLM (Salutation-Manager) module 215 provides a communication function to each of the remote copy scan module 209 and remote copy print module 210 also.

A TCP/IP communication module 216 uses a network driver 217 to provide a network communication function to the above-described various modules. The network driver 217 controls a portion that is physically connected to the network.

A control API 218 provides an interface as to downstream modules such as a later-described job manager module 219 to upstream modules such as the universal sending unit 204. Thus, the dependence relation between the upstream and downstream modules is reduced, thereby improving the compatibility of each.

The job manager module 219 interprets various processing instructed by the above-described various modules via the control API 218, and provides instructions to the later-described modules 220, 224, and 226. Also, the job manager module 219 consolidates the hardware processing executed within the image processing apparatus 110.

The module 220 is a codec manager module, and this module manages/controls various compressions/decompressions of data within the processing that the job manager module 219 instructs.

Also, an FBE encoder module 221 compresses the data read in by the scanning processing executed by the job manager module 219 and a scan manager module 224.

Also, a JPEG codec module 222 performs JPEG compression processing of the data read in with the scanning processing executed by the job manager module 219 or scan manager module 224. Also, the JPEG codec module 222 performs JPEG decompression processing of the printing data used for printing processing executed by a print manager module 226.

Also, an MMR codec module 223 performs MMR compression processing of data read in with the scanning processing executed by the job manager module 219 or scan manager module 224. Also, the MMR codec module 223 performs MMR decompression processing of the printing data used with the printing processing executed with the print manager module 226.

Also, an information-embedded-image codec (IEI CODEC) module 229 decodes information embedding in the image data read in by the scanning processing executed by the job manager module 219 or scan manager module 224. Also, the information-embedded-image codec (IEI CODEC) module 229 performs information embedding processing to the print data used with the printing processing executed with the print manager module 226. Embedding information into image data is performed using encoding techniques such as barcodes and digital watermarking and so forth. Also, the module 209 supports character recognition, wherein a character within an image of the image data is recognized and converted into text data by image-region separation and OCR technique, as a type of decoding technique. Further, overlaying the converted image data wherein text is converted into image data using a raster image processor and the original image data is supported as a type of encoding technique (information embedding technique).

The scan manager module 224 manages and controls the scanning processing that the job manager module 219 instructs. The communication between the scanner 113 connected internally to the scan manger module 224 and image processing apparatus 110 is performed via an SCSI driver 225.

The print manager module 226 manages and controls the printing processing that the job manager module 219 instructs. The interface between the print manager module 226 and the printer 114 is provided by an engine interface (Engine-I/F) module 227.

Also, a parallel port driver 228 is implemented in the image processing apparatus 110, and this driver provides an interface in the event of the web browser module 211 outputting data to an output device (not shown) via a parallel port.

Figure 3:
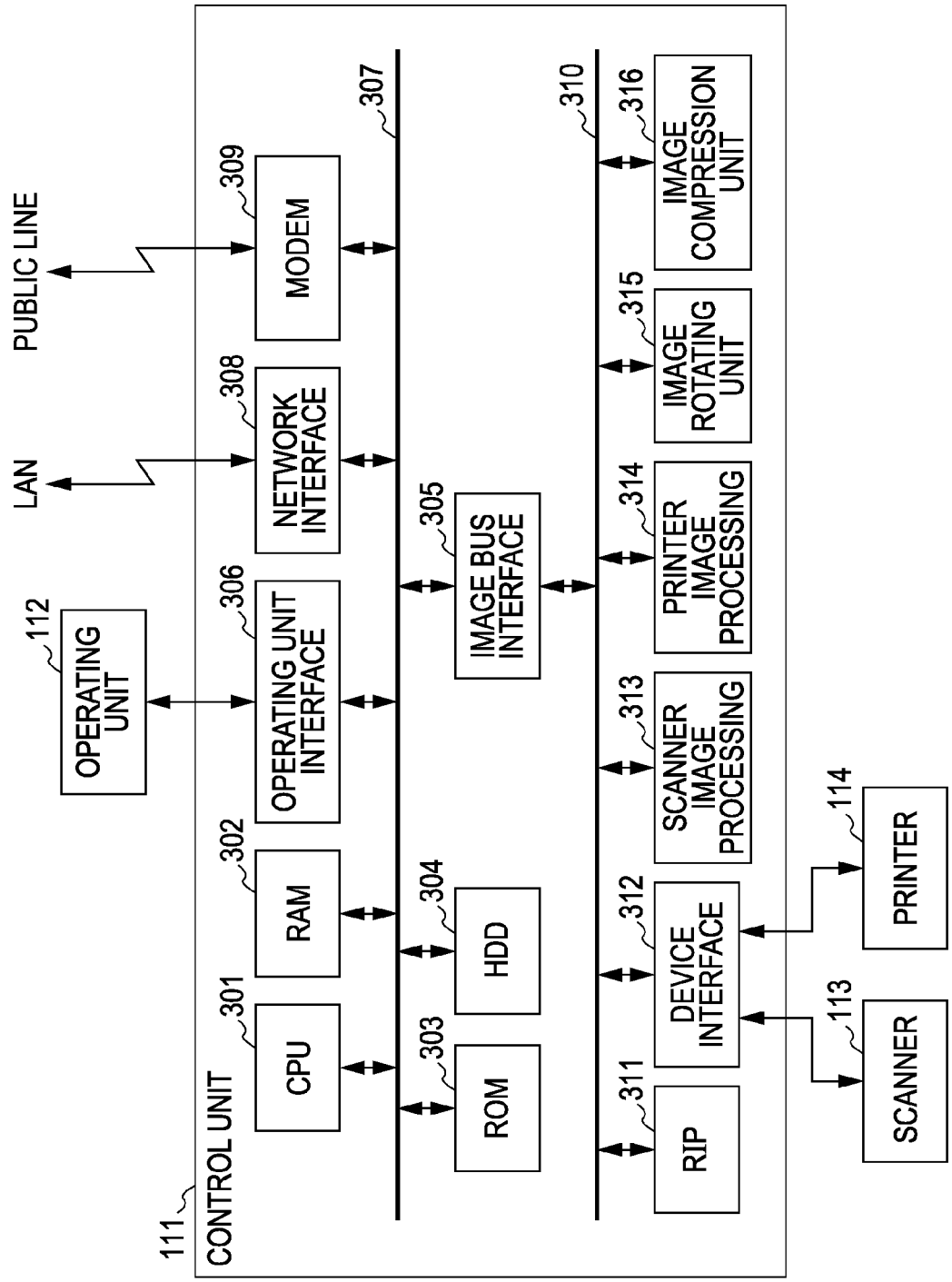
FIG. 3 is a block diagram illustrating a configuration of an image processing apparatus according to an embodiment of the present invention.

Next, the configuration of the image processing apparatus 110 will be described with reference to FIG. 3. FIG. 3 is a block diagram showing a detailed configuration of the image processing apparatus 110 in FIG. 1. The configuration of each of the image processing apparatuses 110, 120, and 130 are the same, so only the configuration of the image processing apparatus 110 will be described.

The image processing apparatus 110 has a control unit 111 to control the overall apparatus, such as shown in FIG. 3. The control unit 111 is connected to a scanner 113 which is an image input device and a printer 114 which is an image output device, and controls these, while also being connected to a LAN or public line and via these performs input/output of image information and device information.

The control unit 111 has a CPU 301, RAM 302, ROM 303, HDD (hard disk device) 304, image bus interface 305, operating unit interface 306, network interface 308, and modem 309. The CPU 301 is connected to each of the above-described units via a system bus 307.

The RAM 302 is memory for providing a work area for the CPU 301, and also is used as image memory to temporarily store image data. The ROM 303 is a boot ROM, and a system boot program is stored in the ROM 303. System software, image data, and so forth are stored in the HDD 304.

The operating unit interface 306 is an interface for performing input/output between the operating unit 112, and performs such functions as outputting image data displayed on the operating unit 112 as to the operating unit 112, and transmitting the information input by the user via the operating unit 112 to the CPU 301.

The network interface 308 is connected to a LAN, and performs input/output of information as to the LAN. The modem 309 is connected to a public line, and performs input/output of information as to the public line.

The image bus interface 305 connects the system bus 307 and the image bus 310 which transfers image data at high speed, and is a bus bridge that converts the data configuration.

The image bus 310 is connected to a RIP (raster image processor) 311, device interface 312, scanner image processing unit 313, printer image processing unit 314, image rotating unit 315, and image compressing unit 316.

The RIP 311 rasterizes a PDL code received from the LAN in a bitmap image. The device interface 312 connects the scanner 113 and printer 114 and control unit 111, and performs synchronous/asynchronous conversion of the image data. The scanner image processing unit 313 performs correcting, processing, editing and so forth as to the input image data. The printer image processing unit 314 performs printer correction, resolution conversion and so forth as to the print output image data. The image rotating unit 315 performs rotating of image data. The image compressing unit 316 performs JPEG compression/decompression processing as to multi-value image data, and performs compression/decompression processing such as JBIG, MMR, MH, and so forth as to binary image data.

Figure 4:
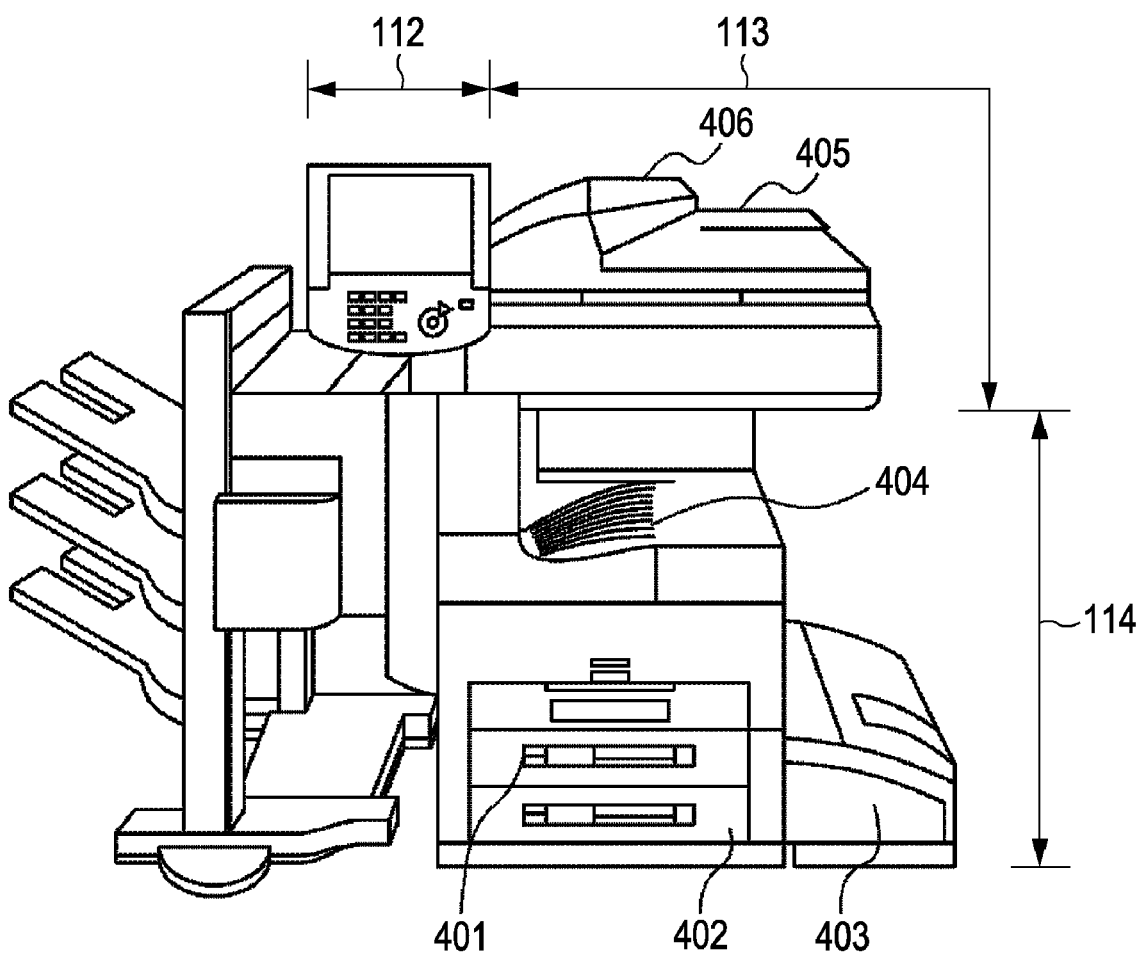
FIG. 4 is an external view of the image processing apparatus according to an embodiment of the present invention.

The external view of an image processing apparatus having the above-described configuration will be described with reference to FIG. 4, which is an external view of the image processing apparatus 110 shown in FIG. 1. Now, the external configurations of the image processing apparatuses 110, 120, and 130 are all the same, so just the external configuration of the image processing apparatus 110 will be described.

With the image processing apparatus 110, the scanner 113 illuminates the image on a sheet serving as an original image, and scans this with a CCD line sensor (not shown), whereby raster image data is generated. Upon a user setting the original sheet on a tray 406 of a document feeder 405 and instructing the start of reading with the operating unit 112, the CPU 301 of the controller unit 111 provides instructions to the scanner 113. The document feeder 405 feeds one original sheet at a time, and the scanner 113 performs a reading operation of the image on the original sheet fed from the document feeder 405.

The printer 114 prints the raster image data on a sheet, and as a printing method thereof, an electrophotography method is used which uses a photosensitive drum and photo conductor belt. However, another method may be used, such as an inkjet method which discharges ink from a minute nozzle array and directly prints the image onto a sheet. The printing operation of the printer 114 is started by instructions from the CPU 301. The printer 114 has multiple supply sheet levels so that different sheet sizes or difference sheet orientations can be selected, whereby sheet cassettes 401, 402, and 403 corresponding thereto are mounted. Also, a discharge tray 404 is provided on the printer 114, and the sheets finished printing are discharged onto the discharge tray 404.

Figure 5:
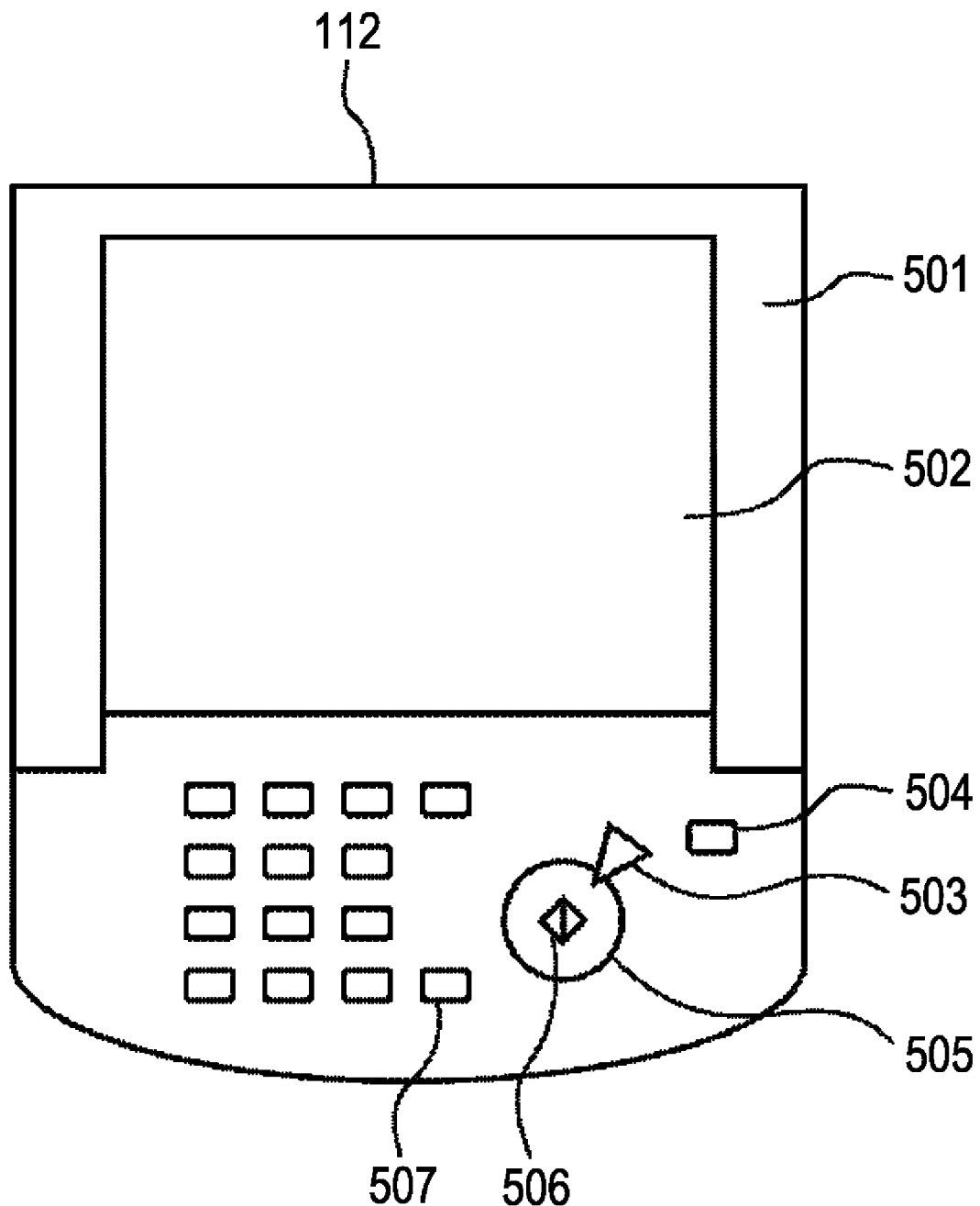
FIG. 5 is an external view of an operating unit according to an embodiment of the present invention.

Next, the configuration of the operating unit 112 will be described with reference to FIG. 5. FIG. 5 is a diagram showing an external configuration of the operating unit 112 in FIG. 1.

The operating unit 112 has an LCD display unit 501 with a touch panel sheet 502 pasted on the LCD, as shown in FIG. 5. A system operating screen and touch-pad keys are displayed on the LCD display unit 501, and when the displayed key is pressed, the position information indicating the pressed position is transmitted to the CPU 301.

Also, various hard keys which are a start key 505, stop key 503, ID key 507, and reset key 504 are provided on the operating unit 112. The start key 505 is a key to instruct starting the reading operation and so forth of the original image, and in the center of the start key 505 is a green and red two-color LED display portion 506. The two-color LED display portion 506 shows whether or not the start key 505 is in a usable state by the color thereof. The stop key 503 is a key to stop the operations during operation. The ID key 507 is a key used when inputting the user ID of the user. The reset key 504 is a key used when initializing settings from the operating unit 112.

Figure 6:
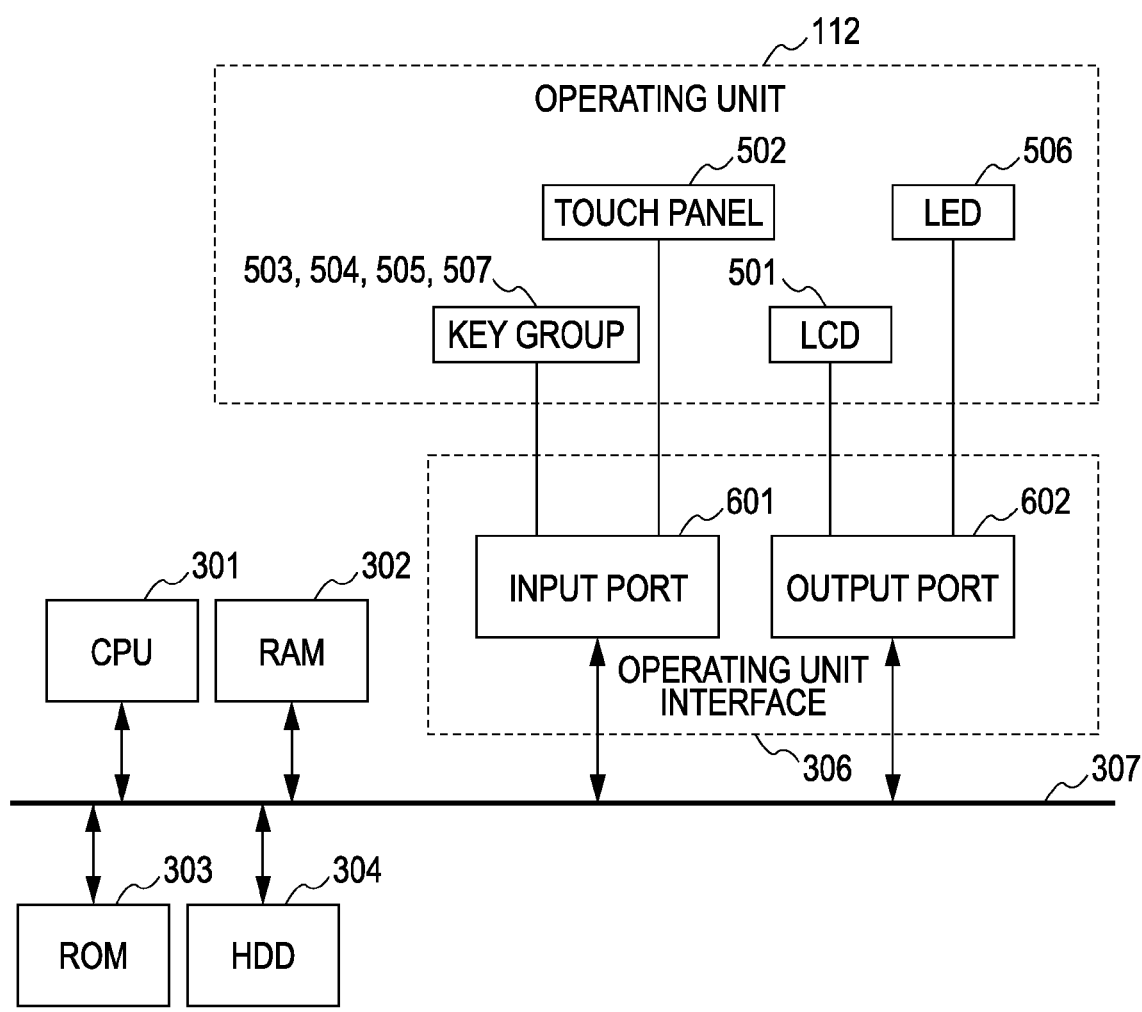
FIG. 6 is a block diagram illustrating a configuration of the operating unit according to an embodiment of the present invention.

Next, the configuration of the operating unit 112 will be described with reference to FIG. 6. FIG. 6 is a block diagram showing a detailed configuration of the operating unit 112 in FIG. 1.

The operating unit 112 is connected to the system bus 307 via the operating unit 306, such as shown in FIG. 6. As described above, the system but 307 is connected to the CPU 301, RAM 302, ROM 303, HDD 304, and so forth.

The operating unit interface 306 has an input port 601 for controlling input from the user and an output port 602 for controlling the screen output device. The input port 601 transfers the user input from the touch panel 502 and a key group including various hard keys 503, 504, 505, and 507 to the CPU 301. The CPU 301 generates display screen data based on user input content and a control program, and outputs a display screen on the LCD display unit 501 via the output port 602. Also, the CPU 301 controls the LED display unit 506 as needed via the output port 602.

Next, a box function that the image processing apparatus 110 has will be described. A temporary region and a box region are provided on the HDD 304 as regions to store the image data. The temporary region is a region to temporarily store image data and so forth which the scanner 113 has read and output an image on an original image. Note that the image data stored in the temporary region is deleted after the job is finished.

The box region is a region for storing image data that the scanner 113 has read and output an image on an original image and image data that PDL data received from the host computer 101 is rasterized. Note that the box region is divided into multiple regions which individual users can individually use, and a number is assigned to each region. A region 100 is provided in the box region of the HDD 3004 of the image processing apparatus 110.

Note that with the description below, the image data stored in the box region may be called "document", but the data format stored in the box region may be any format that can be rasterized into image data. For example vector data or text code data may be used. In the first embodiment, the data herein is called image data or document, and "image data" and "document" are not particularly distinguished.

Figure 7:
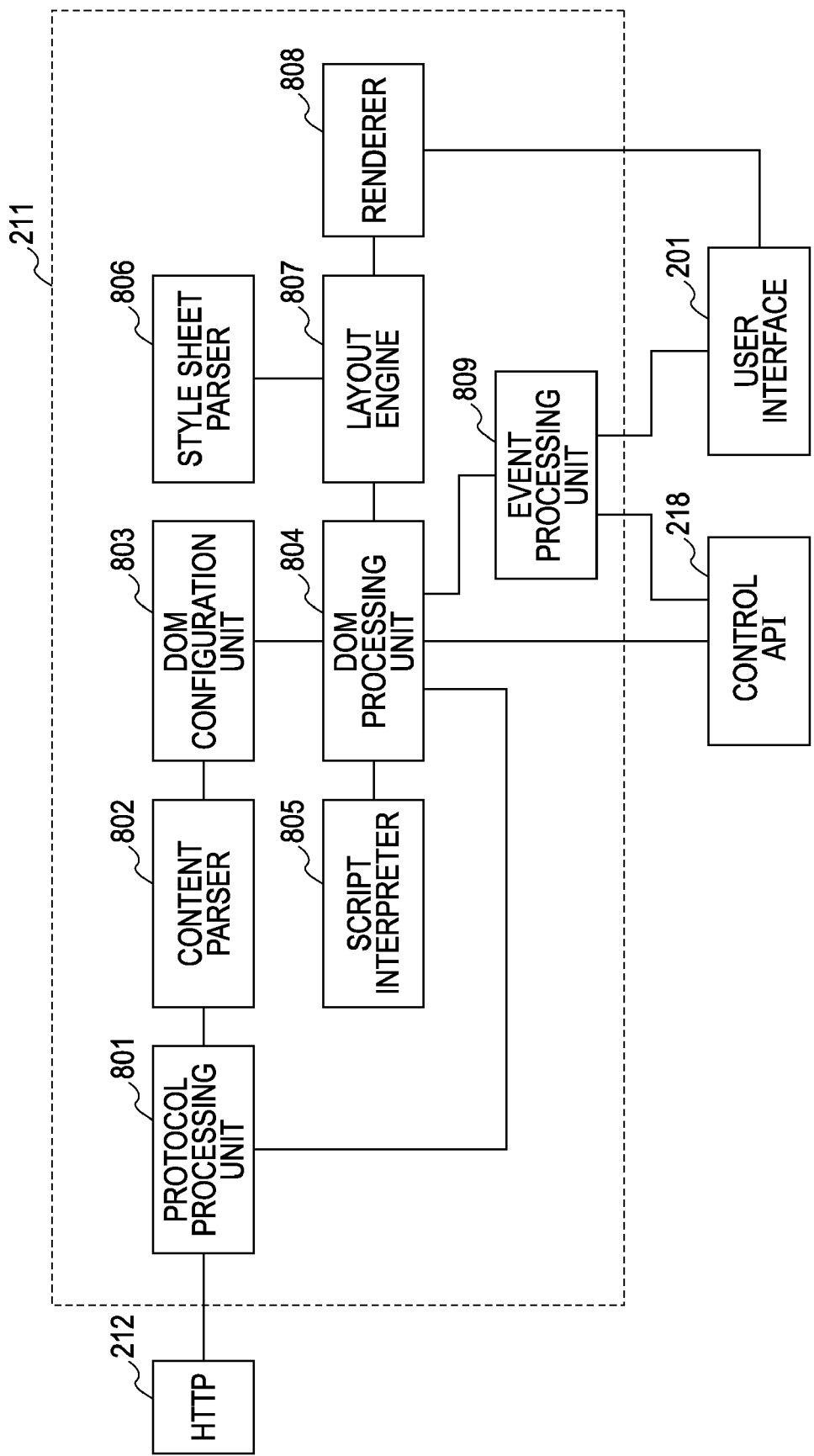
FIG. 7 is a block diagram illustrating a software configuration of a web browser module according to an embodiment of the present invention.

Next, the software configuration of the web browser module 211 will be described with reference to FIG. 7. FIG. 7 is a block diagram showing a software configuration of the web browser module 211.

The web browser module 211 includes a protocol processing unit 801, content parser 802, DOM configuration unit 803, and DOM processing unit 804. Further, the web browser module 211 includes a layout engine 807, style sheet parser 806, renderer 808, scrip interpreter 805 and event processing unit 809.

The protocol processing unit 801 establishes a connection between another network node via the HTTP module 212 and communicates. With this communication, an HTTP request is issued as to a resource described with the URL, and the response thereof is obtained. In this process, encoding/decoding of the communication data in accordance with various encoding formats are also performed.

The content parser 802 receives content data expressed with an expression format such as HTML, XML, XHTML and so forth from the protocol processing unit 801, performs lexical analysis and syntax analysis and generates a parse tree.

The DOM configuration unit 803 receives the parse tree from the content parser 802, and performs configuring of a Document Object Model (DOM) corresponding to the configuration of the content data. With currently-used HTML, various grammatical omissions are forgiven, resulting in multiple variations. Further in many cases the content currently used in the real world is neither in integral form nor appropriate. Thus, the DOM configuration unit 803 infers the correct logical configuration of the content data that is not lexically appropriate, similar to other general web browsers, and attempts configuration of an appropriate DOM.

The DOM processing unit 804 holds the DOM which the DOM configuration unit 803 has configured on the memory as a tree configuration expressing a nested relation of an object group. The various processing of the web browser is realized with the DOM as the center thereof.

The layout engine 807 recursively determines an expression (presentation) on the display of each object according to the tree configuration of the object group that the DOM processing unit 804 holds, and consequently obtains the layout of the overall document. There may be cases wherein expressions on the display for each object are clearly specified with a style sheet format such as a Cascading Style Sheet (CSS), according to the description embedded in the document or a description within a separate file linked from the document. Also, the layout engine 807 reflects the analysis results of the style sheet by the style sheet parser 806 and determines the layout of the document. The style sheet parser 806 analyzes the style sheet associated to the content document.

The renderer 808 generates Graphical User Interface (GUI) data for displaying on the LCD 501 according to the document layout that the layout engine 807 has determined. The generated GUI data is displayed on the LCD 501 with the UI interface 201.

The event processing unit 809 receives operation events that the user has performed as to the touch panel sheet 502 and various keys on the operating unit 112, and performs processing corresponding to each event. Also, the event processing unit 809 receives status transfer events of an apparatus or job or the like from the control API 218, and performs processing corresponding to each event. The DOM tree configuration that the DOM processing unit 804 manages has an event handler registered which corresponds to the various events for each object class and each object instance. The event processing unit 809 determines the object for the applicable event processing from the object group which the DOM processing unit 804 manages according to the generated event, and distributes the event. The object distributing the event executes various processing according to the algorithm of the event handler corresponding to the event thereof. The processing of the event handler includes updating of the DOM that the DOM processing unit 804 has, redrawing instructions as to the layout engine, HTTP request issuance instructions to the protocol processing unit 801, and image processing apparatus function by a call-out of the control API 218.

The script interpreter 805 is an interpreter which interprets and executes a script such as Java script. The script may be embedded in the document or described in a separate file that is linked from the document, whereby operations as to the DOM are performed. The content provider can program dynamic behaviors of the provided document by the script.

Figure 8:
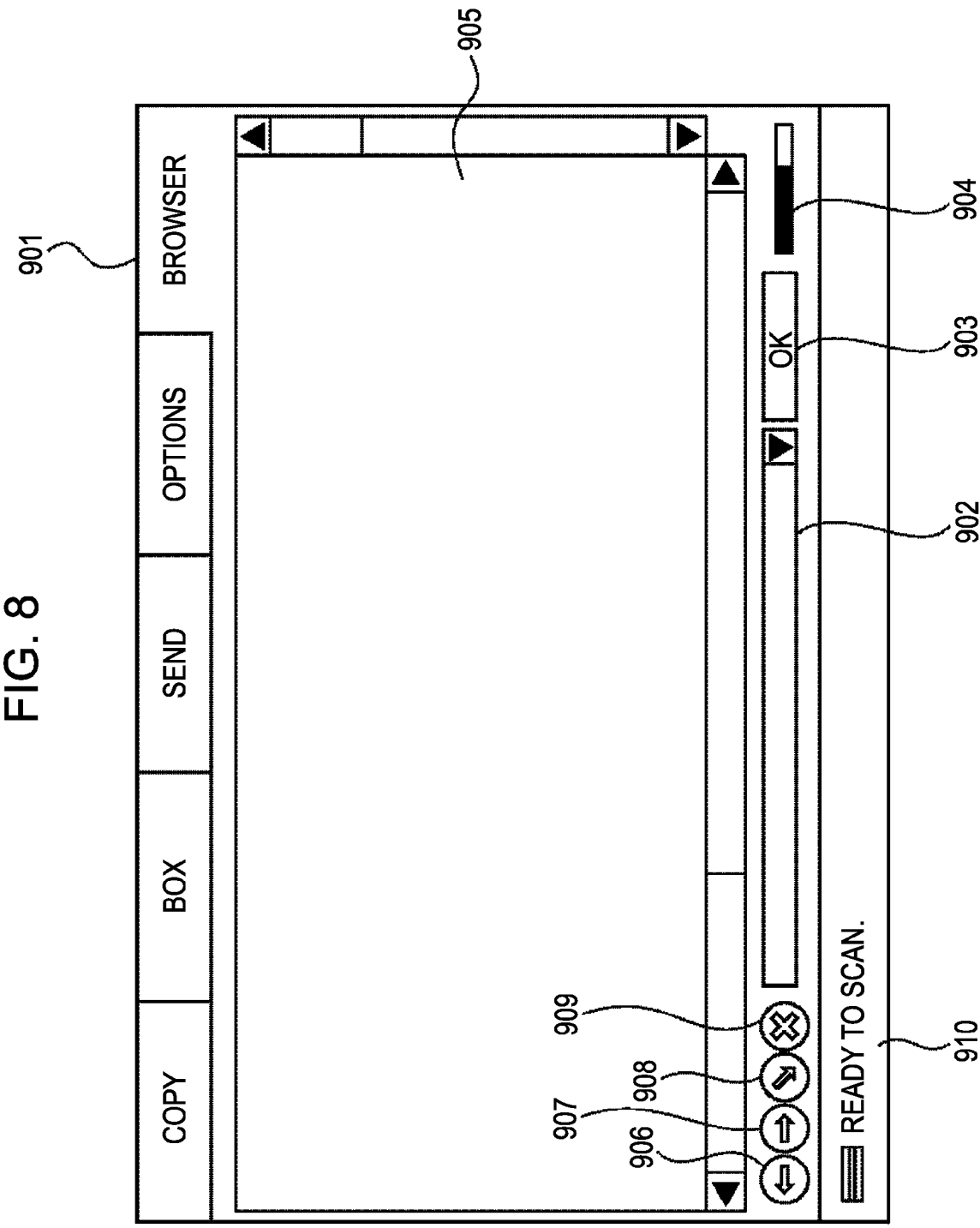
FIG. 8 is a diagram illustrating a screen configuration of a web browser according to an embodiment of the present invention.

Next, a screen configuration of the web browser displayed on the LCD 501 by the UI interface 201 will be described with reference to FIG. 8. FIG. 8 is a diagram showing a screen configuration of the web browser displayed on the LCD 501 by the UI interface 201.

A tab 901, URL input field 902, OK button 903, progress bar 904, content display region 905, and status region 910 are displayed on the screen of the web browser displayed on the LCD 501 with the UI interface 201. Also, a return button 906, advance button 907, reload button 908, and stop button 909 for instructing transfer of the screen on the web browser displayed on the LCD are displayed.

The tab 901 performs screen switching between the web browser function and other functions (copy, box, transmission, option). The URL input field 902 is a field to input a URL of a desired resource of the user, and when the user presses this field, a virtual full keyboard (not shown) for performing text input is displayed. The user can input a desired text string with the touch-panel keys modeling key tops arrayed on the virtual full keyboard.

The OK button 903 is a touch-panel key to confirm the input URL text string. Upon the URL confirmed, the web browser module 211 issues an HTTP request for performing obtaining of the resource. The progress bar 904 shows the progress status of the content obtaining processing with HTTP request response. The content display region 905 is a region that the obtained resource is displayed. The return button 906 is a touch-panel key to review the history of the content display and redisplay the content displayed before the content being displayed at the current point-in-time. The advance button 907 is a touch-panel key for returning to the content display that has been displayed after the content displayed at the point-in-time of pressing the button, when displaying the history of the content display. The reload button 908 performs re-obtaining and redisplaying of the content displayed at the current point-in-time. The stop button 909 is a touch-panel key to stop the content obtaining processing during execution.

The status region 910 is a region displaying a message from various functions of the image processing apparatus. Messages to prompt user warnings can be displayed on the status region 910 from the scanner or printer or other functions, even while the web browser screen is being displayed. Also, similarly messages can be displayed from the web browser function. The web browser function displays a URL text string of a link destination, content title text string, messages instructed by the script, and so forth.

Figure 9:
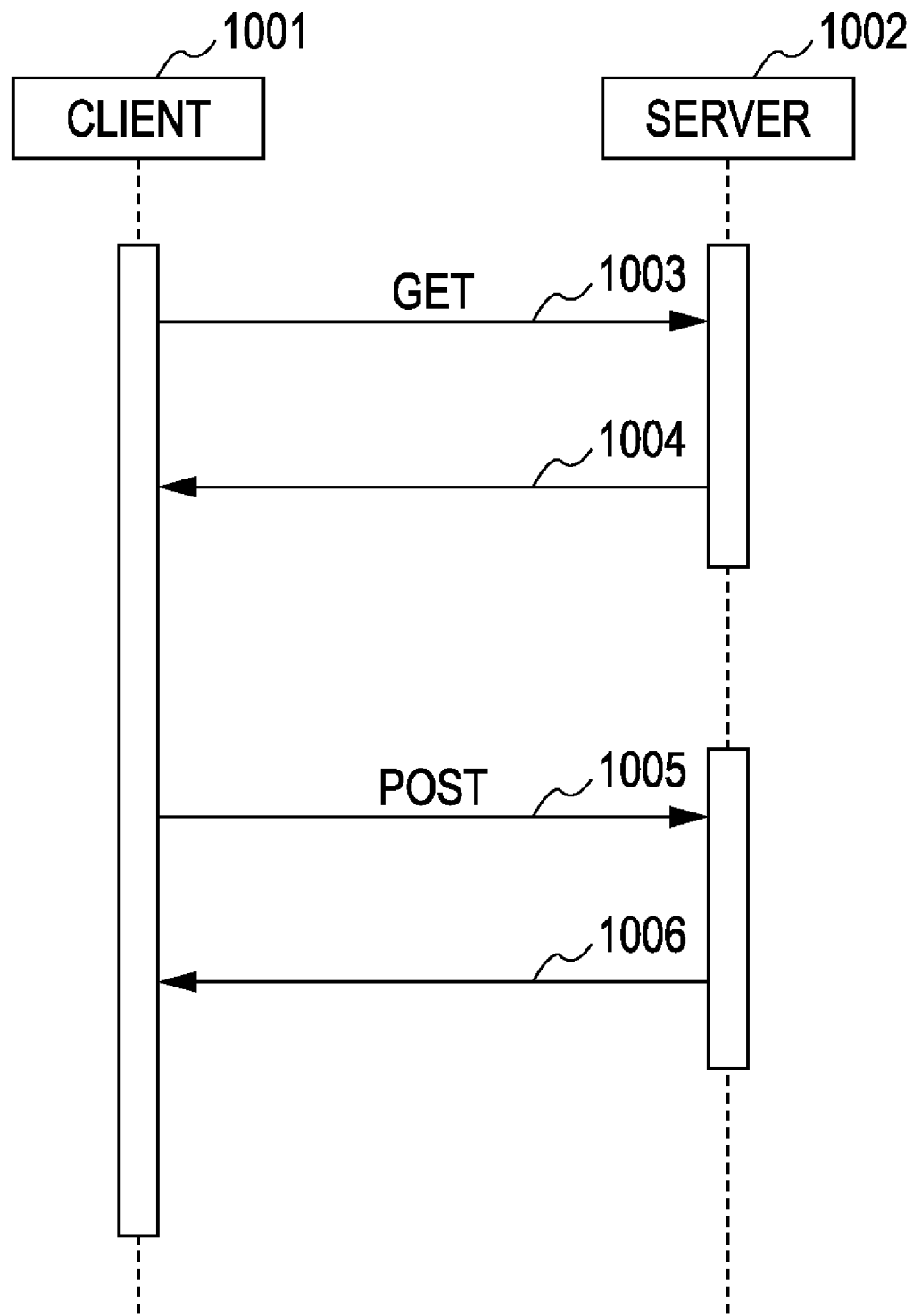
FIG. 9 is a sequence diagram illustrating processing flow of requests and responses by an HTTP protocol according to an embodiment of the present invention.

Next, the operations of the present embodiment will be described with reference to FIG. 9. FIG. 9 is a sequence diagram showing the flow of processing of request and response by an HTTP protocol according to the present embodiment.

As shown in FIG. 9, the client 1001 is software to send an HTTP request and receive an HTTP response. Specifically, the client 1001 is equivalent to a web browser built in to the image processing apparatuses 110, 120, 130, or a general web browser which is operated with a PC (Personal Computer), PDA (Personal Digital Assistant), portable telephone and so forth. Also, the client 1001 may be various types of software that accesses a web server and uses a service or performs relay with a similar method as a web browser. The server 1002 is equivalent to an HTTP server which includes software that receives the HTTP request and performs processing corresponding thereto and further returns the HTTP response, which is software that operates on the server 155.

The client 1001 sends the HTTP request with one method of a GET method or POST method. In the case that the client 1001 sends the HTTP request 1003 as to the desired resource to the server 1002 with the GET method, the resource is generally specified with a URI (particularly URL) format. The server 1002 obtains or generates data corresponding to the resource specified with the HTTP request 1003, and returns this data with the HTTP response 1004. Thus, in the case that the specified resource corresponds to a static file, the server 1002 reads the relevant file from the file system of the server 155 for example and obtains such data. On the other hand, in the case that the specified resource corresponds to processing such as a CGI program or servlet, the server 1002 executes the relevant processing. The data generated as a result of the processing is then returned. For example, in the case that a resource for displaying a consumable goods catalog of the image processing apparatus is specified, software for electronic business transactions is executed. With this software, records of the latest prices and availability of sheets, toner, and parts are referenced from the database, and processing is performed to configure this information into HTML format or XML format and generate catalog document data.

With the client 1001, in the case that the data obtained with the HTTP response 1004 is in a format that can be displayed, the content is displayed. If the obtained data is an HTML document and so forth, obtaining and displaying new resources can be repeated simply by the user selecting link information which is embedded in the document displayed on the web browser as hypertext.

Next, a case wherein the HTTP request is sent with the POST method will be described. In the case that a form is included in an HTML document, the POST method is specified as the transmission method thereof (reference the HTML document in FIG. 10), first, the information input by the user in the form displayed with the web browser of the client 1001 is encoded. The encoded information, i.e. form input content is attached to the HTTP request 1005 and sent to the server 1002. With the server 1002, the specified resource receives data sent from the client 1001 and performs processing, generates an HTTP response 1006, and returns this to the client 1001.

Figures 10, 11:
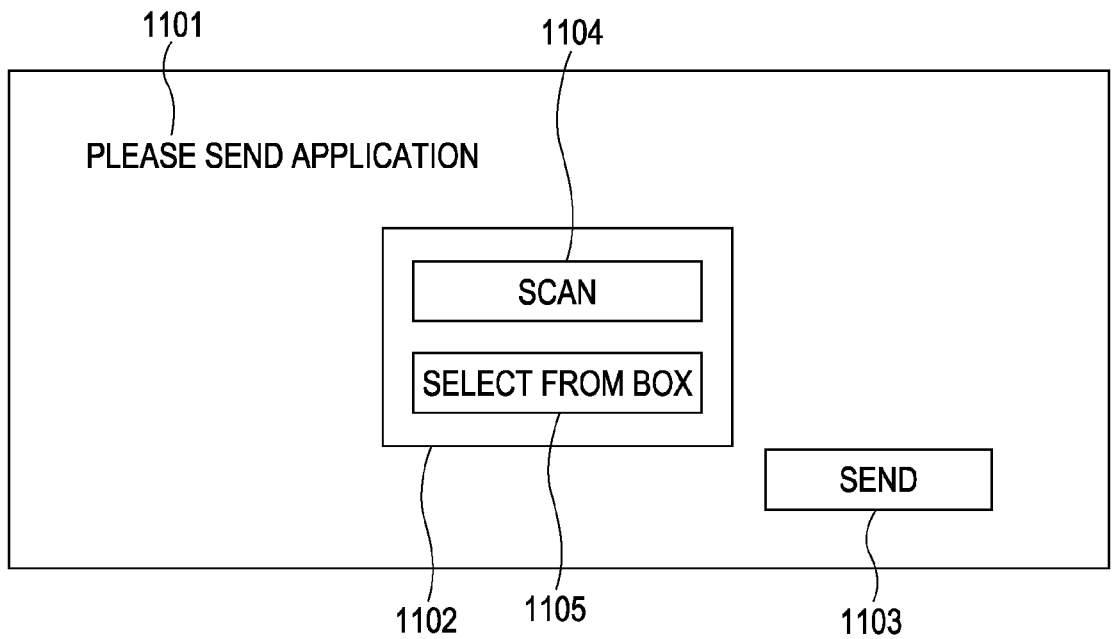
FIG. 10 is a diagram illustrating an example of an HTML document according to an embodiment of the present invention.
FIG. 11 is a diagram illustrating an example of a screen displayed on a web browser according to an embodiment of the present invention.

Next, a configuration of an HTML document including a form specifying the POST method as the sending method thereof and a screen displayed based on such HTML document will be described with reference to FIGS. 10 and 11. FIG. 10 is a diagram including a form, and showing an example of an HTML document specifying the POST method as the sending method thereof and FIG. 11 is a diagram showing a screen displayed on the content display region 905 of the web browser based on the HTML document in FIG. 10.

With the example of an HTML document which includes a form and wherein the sending method thereof is specified as a POST method, as shown in FIG. 10, a tag showing the start of the HTML element is described in the first row. A tag showing the start of a HEAD element is described in the second row, a TITLE element included in the HEAD element is described in the third row, and an ending tag of the HEAD element is described in the fourth row. A tag showing the start of a BODY element is described in the fifth row, and an H1 element is described is the sixth row. A tag showing the start of a FORM element is described in the seventh row. With this tag, information to the effect that the information input in this form is encoded with a "multipart/form-data" format, and sending is performed with the POST method as to a "regist.cgi" resource, is shown by the attributes. The eighth row shows a first INPUT element. With the first INPUT element, the attributes show that the name is "userfile" and the format is "file". The ninth row shows a second INPUT element. With the second INPUT element, information to the effect that the format is "submit", and the value is text string "send" is shown by the attributes. The tenth row shows the end of the FORM element. A tag showing the end of the BODY element is described in the eleventh row. A tag showing the end of the HTML element is described in the twelfth row.

With the client 1001, as shown in FIG. 11, a screen is displayed in the content display region 905 (shown in FIG. 8) based on the HTML document described above with the web browser thereof. With the screen displayed based on the above-described HTML document, the display corresponding to the H1 element of the third row in FIG. 10 becomes the display 1101. Also, the display corresponding to the INPUT element of the "file" form in the eighth row in FIG. 10 becomes the display 1102 in the rectangular region. The display corresponding to the INPUT element of the "submit" form in the ninth row in FIG. 10 becomes the display 1103.

Now, display objects 1104 and 1105 which are display objects unique to the web-browser of the image processing apparatus 110 are displayed in the display 1102 region. The display object 1104 is a "scan" button to specify that the image data from which the scanner 113 has read an image on the original image and output is input. The display object 1105 is a "select from box" button to specify that the image data stored beforehand in the box region in the HDD 304 is read and input.

Figure 12:
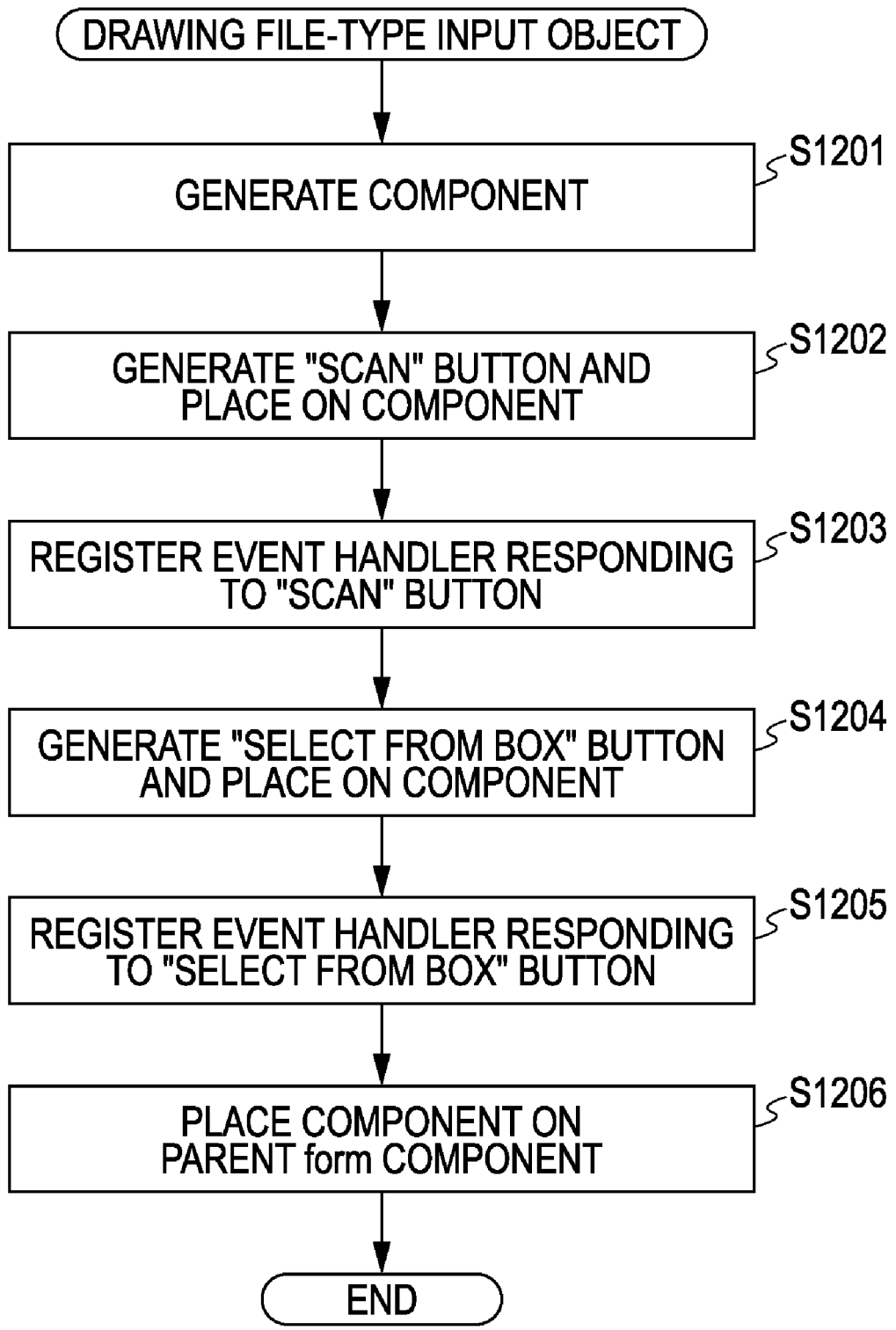
FIG. 12 is a flowchart describing procedures for layout processing of a display object according to an embodiment of the present invention.

Next, layout processing of an object corresponding to an INPUT element in "file" form which is performed with the web browser of the image processing apparatus 110 will be described with reference to FIG. 12. FIG. 12 is a flowchart showing procedures of the layout processing of the layout processing of the display object corresponding to the INPUT element in "file" form which is performed with the web browser of the image processing apparatus 110. With the present layout processing, description is given as the layout being generated corresponding to the display 1102 of the screen shown in FIG. 11.

The CPU 301 generates a component object serving as an increment of the layout processing in step S1201, as shown in FIG. 12. Following this, in step S1202, the CPU 301 generates a "scan" button, and disposes this on a component.

Next, in step S1203, the CPU 301 registers reading processing using the scanner 113 as an event handler which starts when an event occurs that the generated "scan" button is pressed.

In the following step S1204, a "select from box" button is generated, and disposed on a component. In step S1205, the CPU 301 registers readout processing of the image data from the HDD 304 as an event handler which starts when an event occurs that the generated "select from box" button is pressed.

In step S1206, the CPU 301 disposes the component on a component object corresponding to the FORM element which is a parent component of the component herein. With a similar procedure, a tree configuration is generated which expresses the inclusive relation of the component objects corresponding to the various elements, and the screen display layout is performed by recursively processing this tree.

Figure 24:
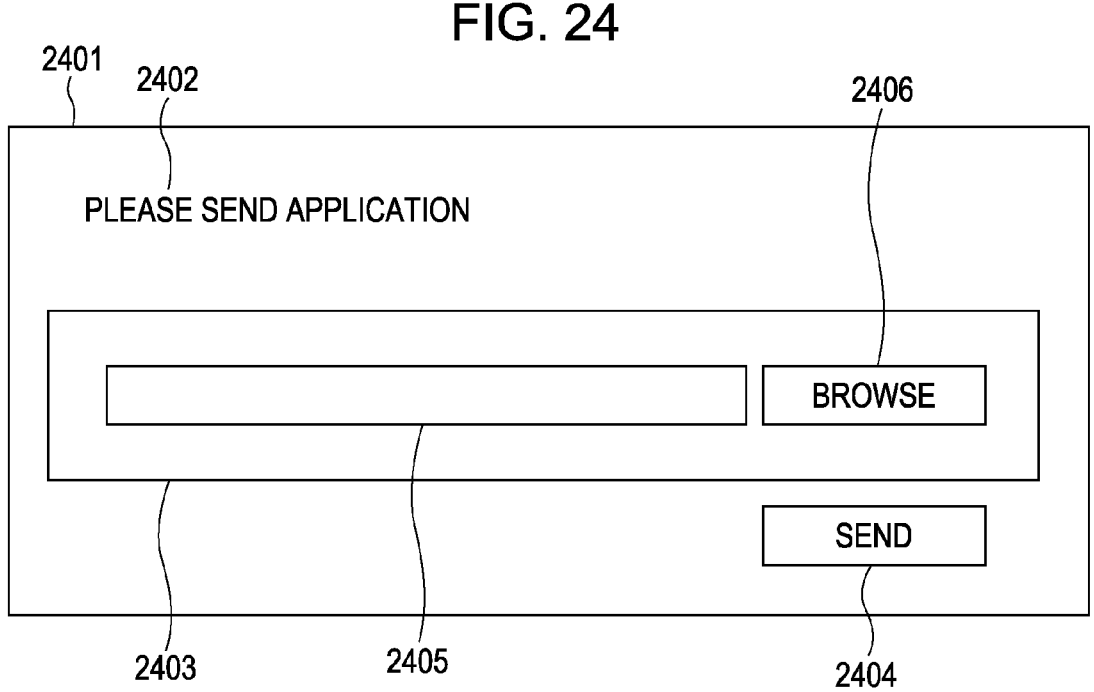
FIG. 24 is a diagram illustrating an example of a screen displayed on a conventional web browser.

Thus, instead of the screen displayed with a general browser as a screen corresponding to an HTML document described in a form for requesting image data input (FIG. 24), with the present embodiment the screen shown in FIG. 11 is displayed.

Figure 13:
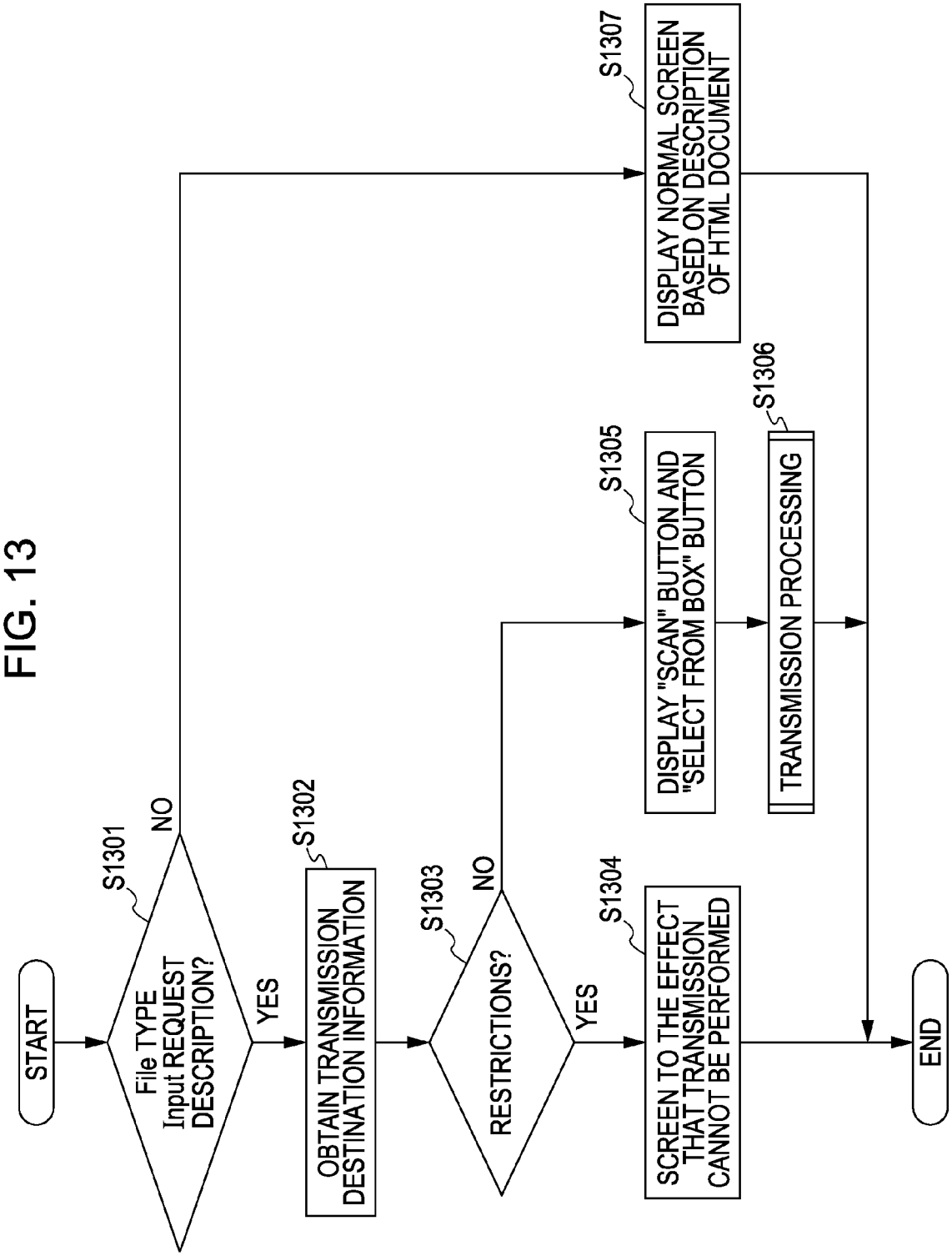
FIG. 13 is a flowchart describing procedures of a transmitting process according to an embodiment of the present invention.

Next, processing which the image processing apparatus 110 performs to transmit image data based on an HTML document, obtained from the server 155, with a form described including INPUT elements in "file" form, will be described with reference to FIG. 13. FIG. 13 is a flowchart illustrating the procedures of image data transmission processing executed by the CPU 301 of the image processing apparatus 110.

First, in step S1301, the CPU 301 determines whether or not a form is described to request input of image data in the document obtained from the server 155. Specifically, in the case that the CPU 301 recognizes that a form is described including INPUT elements in "file" form in the HTML document, the CPU 301 determines that a form is described to request input of image data.

In the case determination is made in step S1301 that a form requesting input of image data is not described, the flow is advanced to step S1307, and a normal screen based on the described HTML document is displayed. ON the other hand, in the case determination is made in step S1301 that a form requesting input of image data is described, in step S1302 the transmission destination information of the input image data is obtained.

For example, in the case of transmitting image data based on the HTML document shown in FIG. 10, image data is sent as to a partner server with which commands are exchanged along the sequence shown in FIG. 9, whereby the IP address of the partner server is obtained. Also, in the case that the IP address of a specified server is described instead of the "regist.cgi" described in the seventh row of the HTML document shown in FIG. 10, the image data is sent to this server, whereby the IP address thereof is obtained as transmission destination information.

In the following step S1303, determination is made as to whether or not transmission of the image data should be restricted, based on the transmission destination information obtained in step S1302. Note that the CPU 301 performs the determination with reference to the managing table shown in FIG. 14.

Figures 14, 15:
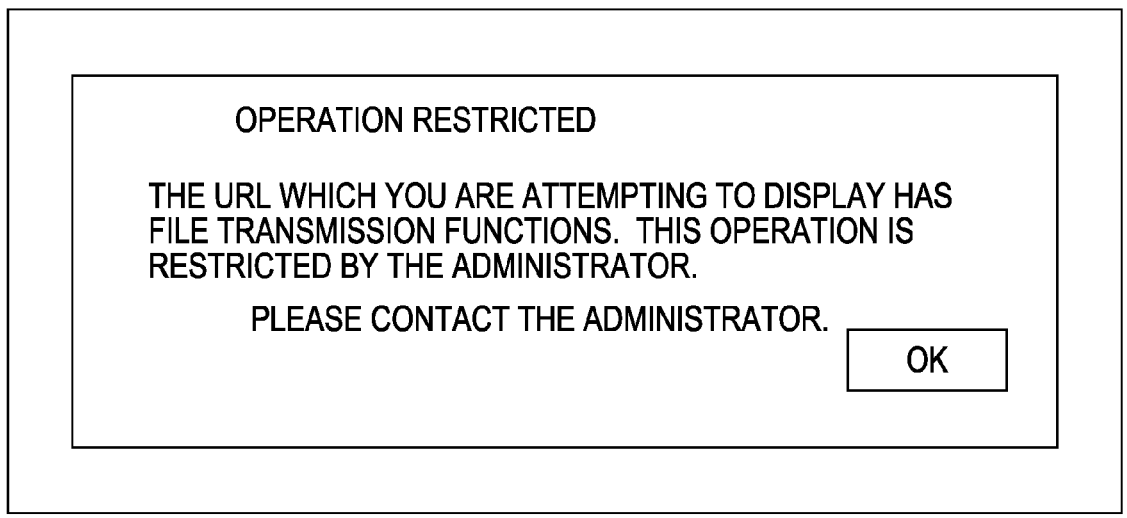
FIG. 14 is a flowchart describing procedures of processing for inputting image data output by a scanner reading an image on an original image.
FIG. 15 is a diagram illustrating an example of a screen displayed on a web browser according to an embodiment of the present invention.

FIG. 14 shows a managing table stored in the ROM 303. The IP address of the server to be subject to transmission restrictions is managed in the managing table shown in FIG. 14, as information to determine whether or not transmission of the image data should be restricted. Note that the information managed in the managing table is not necessarily the IP address, and may be any information which can identify the transmission destination such as a URL.

In the case determination is made in step S1303 that transmission of the image data should be restricted, the flow is advanced to step S1304, and a message to the effect that transmission of the image data is restricted is displayed on the content display region 905 of the web browser.

FIG. 15 shows an example of a screen displayed in step S1304. As shown in FIG. 15, in step S1304, a message indicating that the HTML document obtained from the server 155 has a file upload function, and that transmission of image data is restricted, is displayed.

On the other hand, in the case determination is made in step S1303 that transmission of image data should not be restricted, the flow is advanced to step S1305, and the screen shown in FIG. 11 is displayed in the content display region 905. In the following step S1306, transmission processing of the image data is executed, and the processing is ended.

Figure 16:
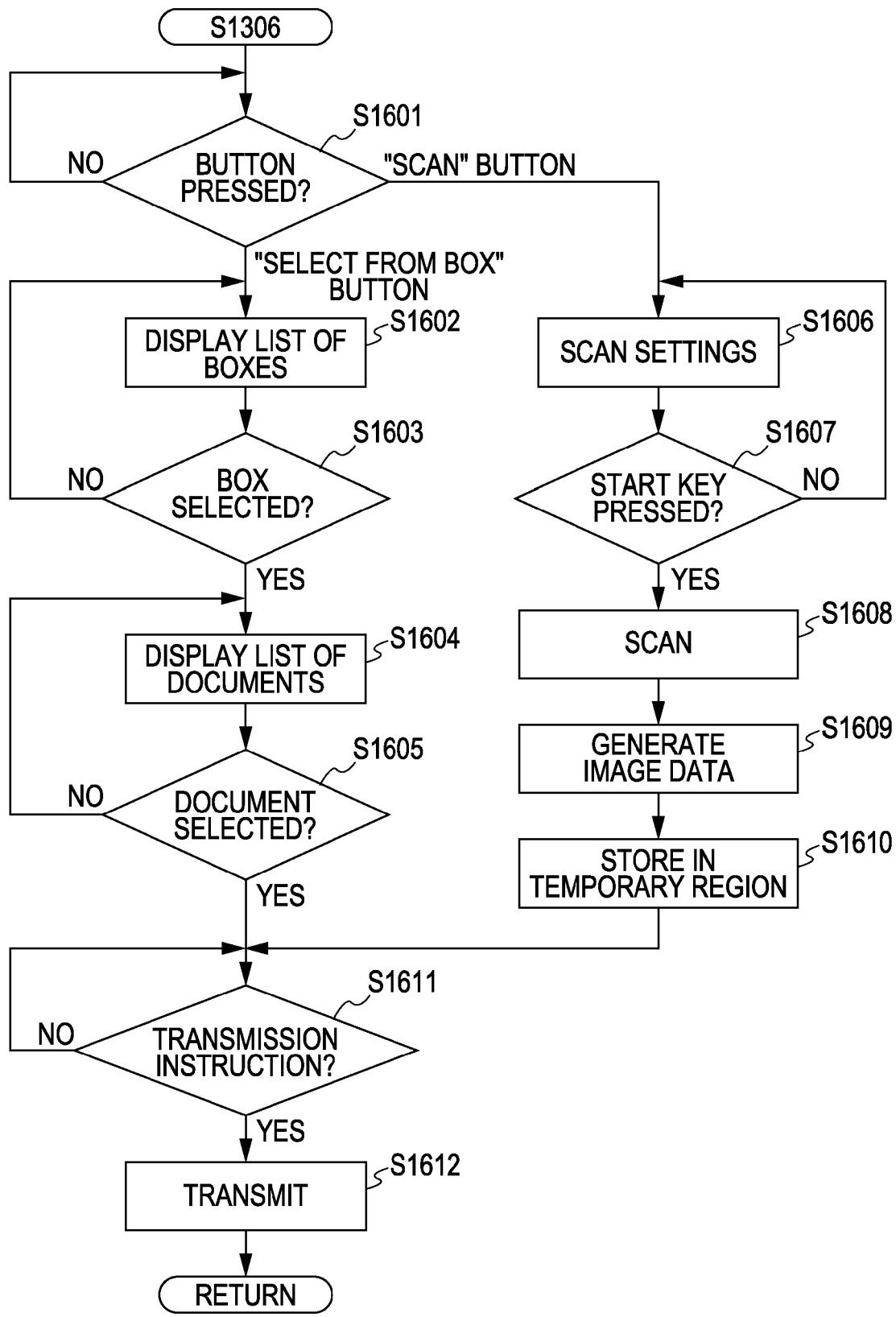
FIG. 16 is a flowchart describing procedures of a transmitting process according to an embodiment of the present invention.

Next, transmission processing of the image data in step S1306 in FIG. 13 will be described with reference to FIG. 16. FIG. 16 is a flowchart showing procedures of transmission processing of the image data that is executed by the CPU 301 of the image processing apparatus 110.

First in step S1601, determination is made with the screen shown in FIG. 11 as to whether or not one of the "scan" button 1104 or "select from BOX" button 1105 is pressed. In the case determination is made that the "select from BOX" button 1105 is pressed, the flow is advanced to step S1602, and a box menu screen is displayed.

Figure 17:
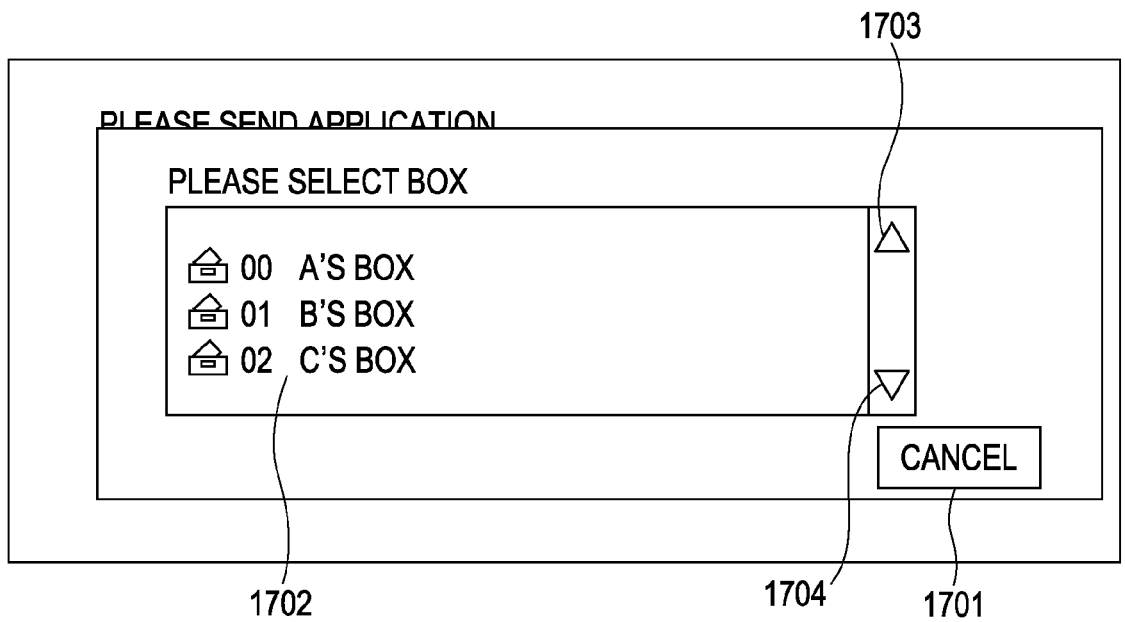
FIG. 17 is a diagram illustrating an example of a screen displayed on a web browser according to an embodiment of the present invention.

FIG. 17 shows an example of a box menu screen. The box selection cell 1702 displays information that each row relates to one box (box number, box name assigned to box). Upon one of the rows being selected by the user, a screen displaying a list of documents stored in the selected box is displayed. Upon the scroll button 1703 or 1704 being pressed, the range of the box displayed in the box selecting cell is changed. Upon the cancel button 1701 being pressed, the processing is stopped and the screen is returned to the screen in FIG. 11.

In the screen shown in FIG. 17, in the case that one of the boxes is selected (Yes in step S1603), the flow is advanced to step S1604, and a document menu screen is displayed.

Figure 18:
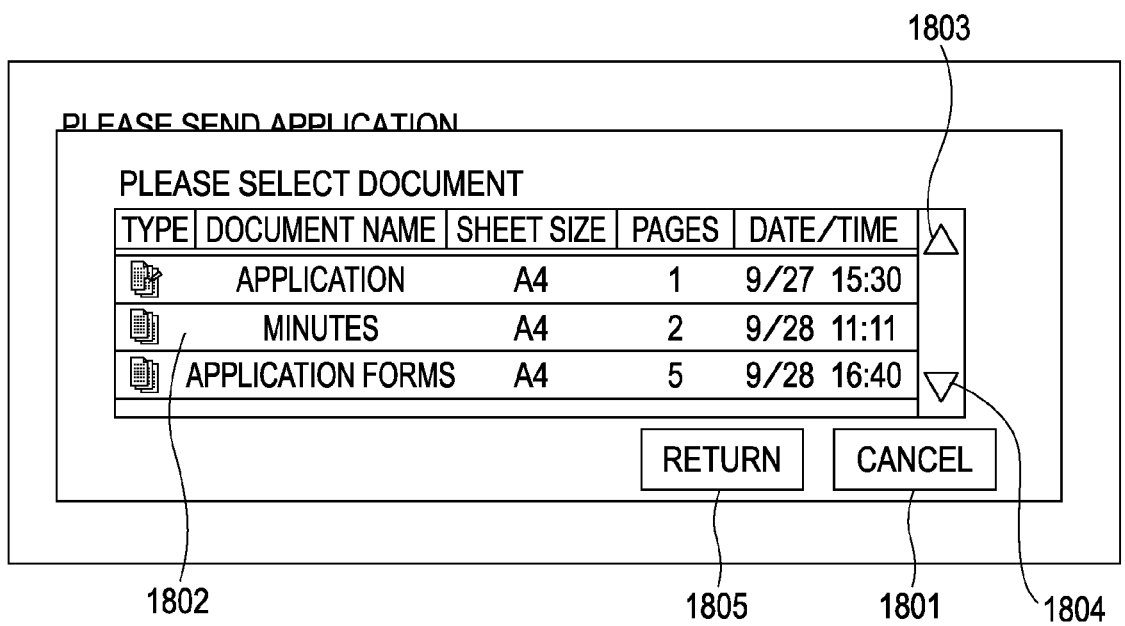
FIG. 18 is a diagram illustrating an example of a screen displayed on a web browser according to an embodiment of the present invention.

FIG. 18 shows an example of a document menu screen, wherein a cancel button 1801, document selecting cell 1802, scroll buttons 1803 and 1804, and return button 1805 are displayed.

The document selecting cell 1802 displays information relating to the document stored in the selected box (document type, document name, paper size, number of pages, date/time stored, and so forth) in one row for each document. Upon the user selecting one of the rows, the selected document is determined to be the transmission document, and the screen is returned to the screen in FIG. 11. In this case, with the screen shown in FIG. 11, the "select from box" button 1105 is reverse displayed, whereby the user can recognize that a document from the box is selected. Note that the document determined to be the transmission document may be stored in a temporary region of the HDD 304.

Upon the scroll buttons 1803 and 1804 being pressed, the range of the document displayed in the document selecting cell 1802 is changed. The button 1805 is a return button, and the screen is returned to the screen in FIG. 17. Upon the cancel button 1801 being pressed, the processing is stopped and the screen is returned to the screen in FIG. 11.

On the other hand, in the case determination is made in step S1601 that the "scan" button 1104 is pressed, the flow is advanced to step S1606, and scanning parameters such as reading resolution are received from the user.

In the following step S1607, determination is made as to whether the start key 505 is pressed, and in the case determination is made that the start key 505 has been pressed, the flow is advanced to step S1608, the scanner 113 is operated, and the original image is read.

Further, in step S1609 the image data is generated based on the image on the read original image, in step S1610 the generated image data is stored in the temporary region of the HDD 304, and the screen is returned to the screen shown in FIG. 11. In this case, in the screen shown in FIG. 11, the "scan" button 1104 is reverse displayed, whereby the user can recognize that the image data input from the scanner 113 is stored.

In step S1611, determination is made as to whether transmission of the image data is instructed by the user. Specifically, in the case that the transmission button 1103 is pressed in the screen shown in FIG. 11, determination is made that transmission of the image data is instructed by the user.

In the case that transmission of the image data is instructed, in the following step S1612 the document selected in step S1605 or the document stored in the temporary region in step S1610 is transmitted to the server 155.

Thus, according to the first embodiment, in the case of obtaining, from the ASP, a web page in which a general-use form to request a file upload is described, transmission of the image data can be restricted according to the transmission destination of the image data. Thus, information leakage can be prevented.

Figure 19:
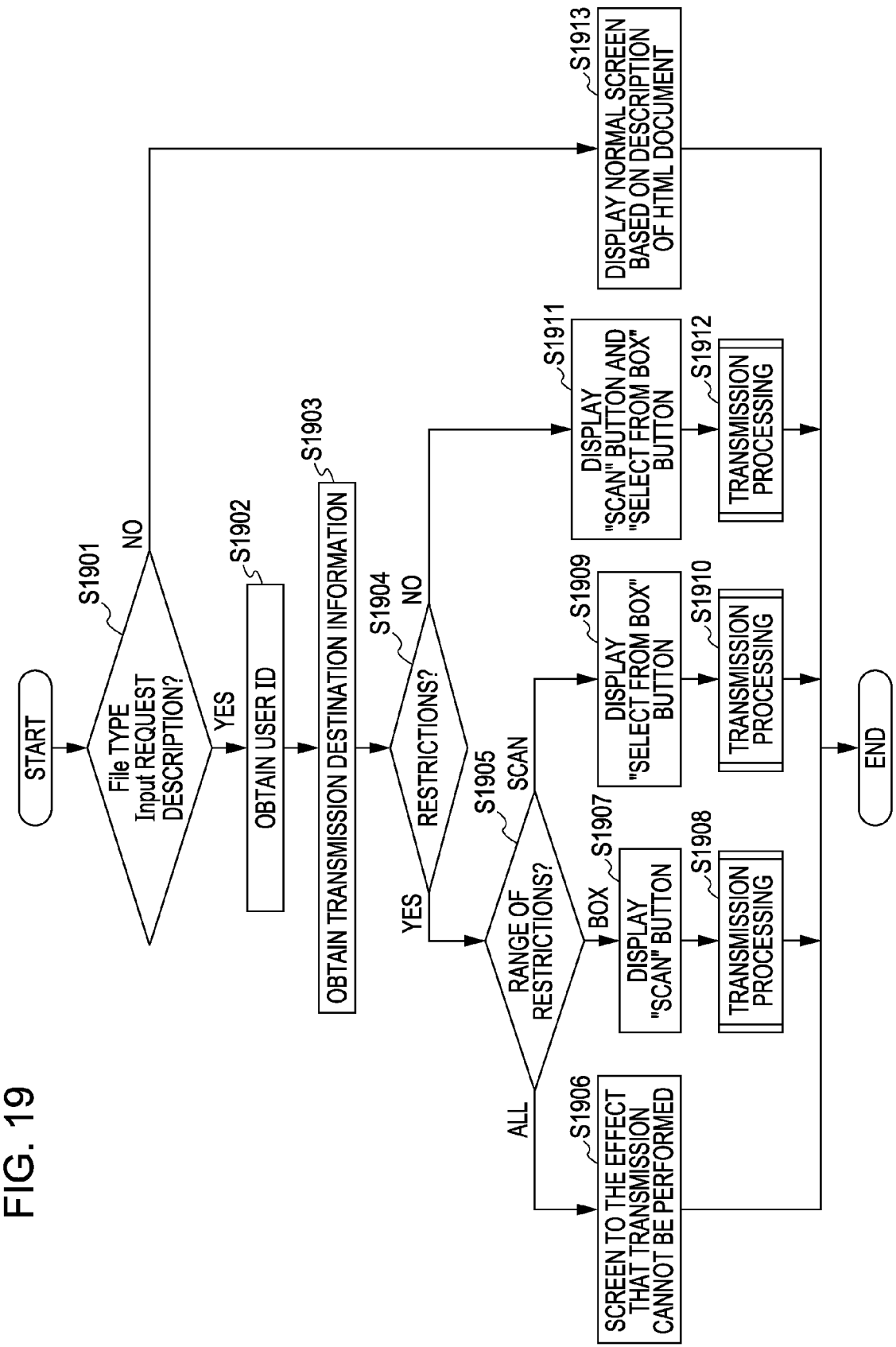
FIG. 19 is a flowchart describing procedures of a transmitting process according to an embodiment of the present invention.

Next, a second embodiment of the present invention will be described with reference to FIG. 19. FIG. 19 is a flowchart describing procedures for transmission processing of the image data executed by the CPU 301 of the image processing apparatus 110 relating to the second embodiment of the present invention. Processing to transmit image data based on an HTML document wherein a form is described including INPUT elements in "file" form is obtained from the server 155 will be described. Note that the second embodiment has the same configuration as the first embodiment except for the processing in FIG. 19, so the description thereof will be omitted herein.

First, in step S1901, the CPU 301 determines whether or not a form is described to request input of image data in the document obtained from the server 155. Specifically, in the case that a form including the INPUT elements in "file" form is described in the HTML document is recognized, the CPU 301 determines that a form requesting input of image data is described.

In the case determination is made in step S1901 that a form requesting input of image data is not described, the flow is advanced to step S1913, and a normal screen based on a described HTML document is displayed.

Figure 20:
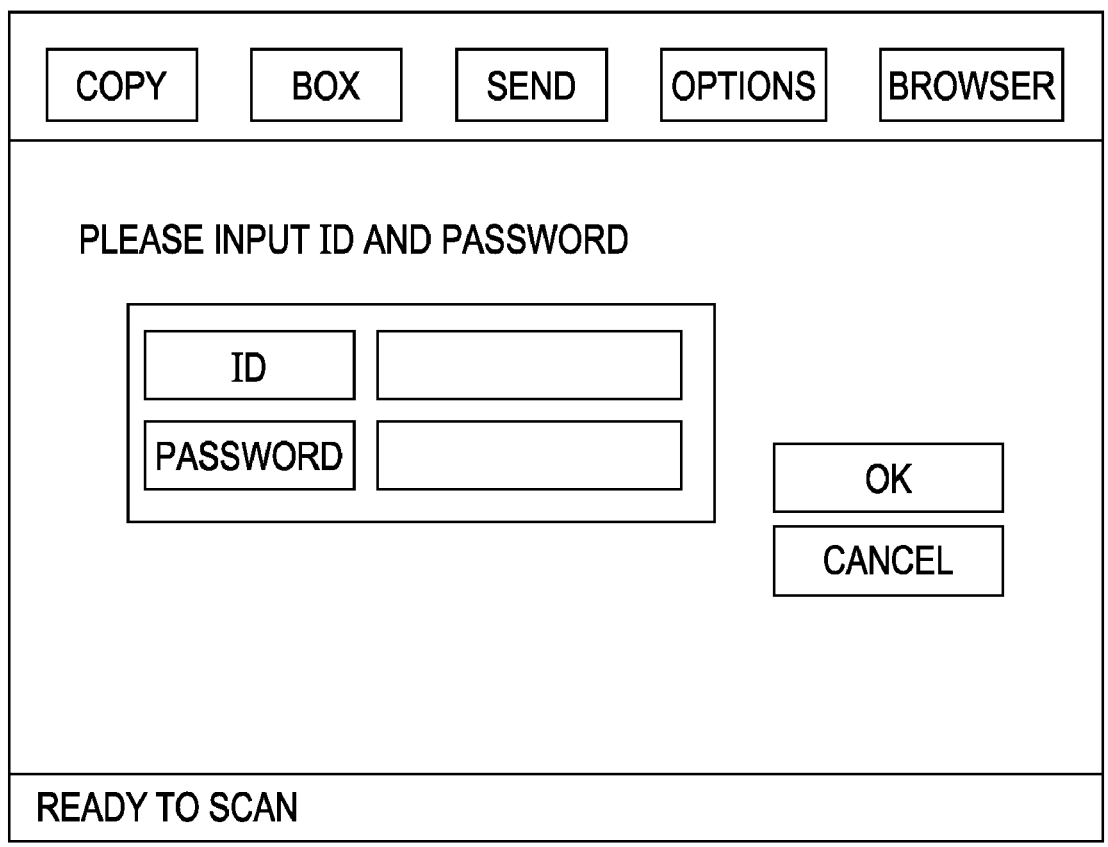
FIG. 20 is a diagram illustrating an example of a screen displayed on an LCD display unit according to an embodiment of the present invention.

On the other hand, in the case determination is made in step S1901 that a form requesting input of image data is described, a user ID of the user operating the image processing apparatus 110 is obtained in step S1902. The user ID obtained is a user ID input in a login screen shown in FIG. 20 before the user begins to operate the image processing apparatus 110. The CPU 301 identifies the user operating the image processing apparatus 110 based on the user ID.

In the following step S1903, similar to step S1302 in FIG. 13, the information of the transmission destination of the input image data is obtained.

Further, in step S1904, determination is made as to whether or not transmission of the image data should be restricted, based on the user ID obtained in step S1902 and the transmission destination information obtained in step S1903. Note that the CPU 301 performs determination here with reference to the managing table shown in FIG. 21.

Figures 21, 22:
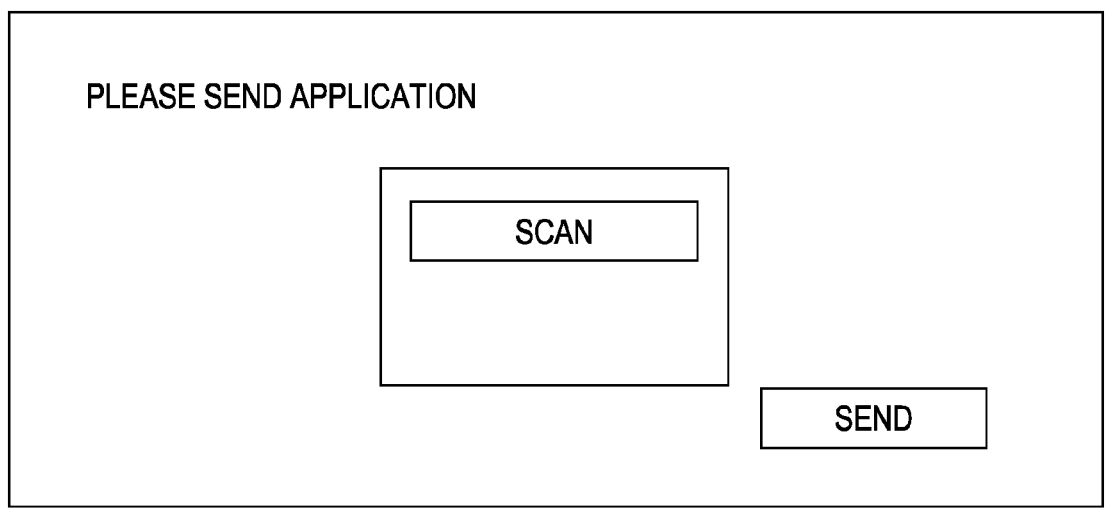
FIG. 21 is a diagram illustrating an example of a managing table according to the present invention.
FIG. 22 is a diagram illustrating an example of a screen displayed on a web browser according to an embodiment of the present invention.

FIG. 21 shows a managing table stored in the ROM 303. With the managing table shown in FIG. 21, the server wherein transmission of image data is subject to restrictions, and the various users operating the image processing apparatus 110, are correlated and managed. Further, in the case that transmission of image data is restricted, information showing the range of restrictions is managed in the managing table shown in FIG. 21.

In the example shown in FIG. 21, for example for user A, transmission of both the image data input from the scanner 113 and the image data read and input from the box are restricted as to the server 111.111.111.111. Also, for user B, transmission of image data input from the scanner 113 is restricted as to the server 111.111.111.222, but transmission of image data read and input from the box is not restricted thereto.

In the case a determination is made in step S1904 that transmission of image data should not be restricted, the flow is advanced to step S1911, and similar to step S1305 in FIG. 13, the screen shown in FIG. 11 is displayed on the content display region 905 of the web browser. Also, in the following step S1912, similar to step S1306 in FIG. 13, transmission processing is executed and the flow is ended.

On the other hand, in the case determination is made in step S1904 that transmission of image data should be restricted, the flow is advanced to step S1905, and determination of the range of transmission restrictions is performed. In the case determination is made that the range of restrictions is ALL, the flow is advanced to step S1906, and similar to step S1304 in FIG. 13, a message to the effect that transmission of image data is restricted is displayed on the content display region 905 of the web browser.

On the other hand, in the case determination is made in step S1905 that the range of restrictions is the box, the flow is advanced to step S1907, and instead of the screen shown in FIG. 11, the screen shown in FIG. 22 is displayed. Compared to the screen shown in FIG. 11, we can see that the "select from box" button is not displayed on the screen shown in FIG. 22. This is because in the determination in step S1905, determination is made that transmission of the image data read from the box and input is restricted.

In the following step S1908, similar to step S1306 in FIG. 13, transmission processing of the image data is performed. Note that the "select from box" button is not displayed, whereby in S1601 in FIG. 16, determination will not be made that the "select from box" button is pressed.

Figure 23:
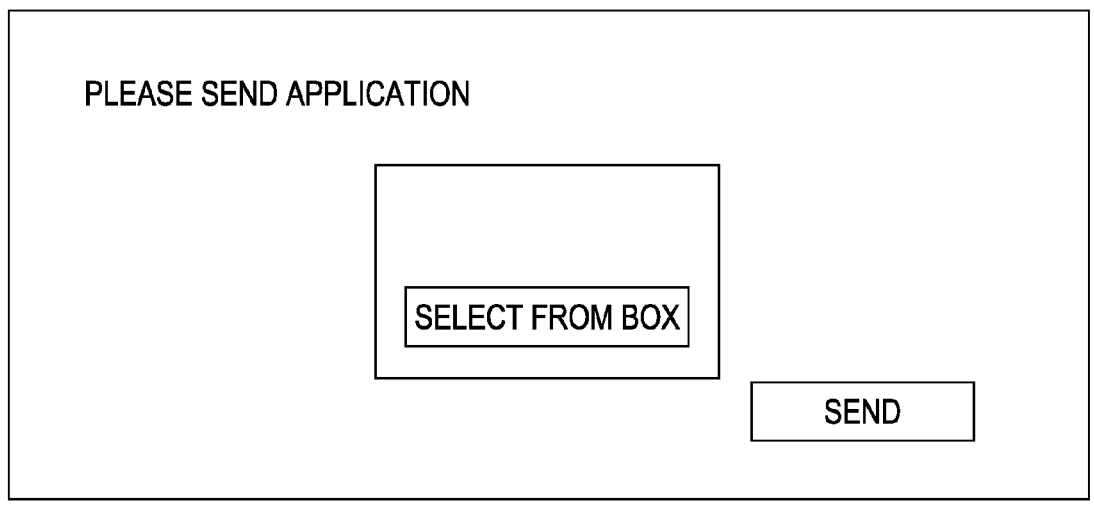
FIG. 23 is a diagram illustrating an example of a screen displayed on a web browser according to an embodiment of the present invention.

On the other hand, in the case determination is made in step S1905 that the range of restrictions is the scanner, the flow is advanced to step S1909, and instead of the screen shown in FIG. 11, the screen shown in FIG. 23 is displayed. Compared to the screen shown in FIG. 11, we can see that the "scan" button is not displayed on the screen shown in FIG. 23. This is because in the determination in step S1905, determination is made that transmission of the image data input from the scanner 113 is restricted.

In the following step S1910, similar to step S1306 in FIG. 13, transmission processing of the image data is performed. Note that the "scan" button is not displayed, whereby in S1601 in FIG. 16, determination will not be made that the "scan" button is pressed.

Thus, according to the second embodiment, in the case of obtaining, from the ASP, a web page in which a general-use form to request a file upload is described, transmission of image data can be restricted according to the transmission destination of the image data and the user operating the image processing apparatus. Also, determination can be performed as to whether or not transmission of image data input from various input units should be restricted, independently for each of a mutually different first input unit and second input unit. Thus, restrictions can be placed individually for each user.

Note that with the above-described first and second embodiments, description is given for the case wherein IP addresses corresponding to servers subject to restrictions are managed in the managing tables shown in FIGS. 14 and 21. However, the information managed in these managing tables are not necessarily information showing servers subject to restrictions, but for example, information showing servers permitted transmission may be managed. In this case, in the event the obtained transmission destination information is not managed in the managing tables, the CPU 301 determines that the transmission of the image data should be limited.

The above embodiments have been described as examples, but the present invention can provide a system, apparatus, method, program, or storage medium (recording medium) and so forth as an embodiment. Specifically, the present invention may be applied to a system configured from multiple devices, or may be applied to an apparatus made up of one device.

Note that the present invention supplies a software program that realizes the functions of the above-described embodiments (a program corresponding to the flowchart shown in the diagrams with the embodiments) directly, or from a distance, to the system or apparatus. The case in which a computer of the system or apparatus thereof reads out and executes the supplied program code is also included.

Accordingly, in order to realize the function processing of the present invention with a computer, the program code itself that is installed in the computer also realizes the present invention. That is to say, the present invention includes a computer program itself for realizing the functional processing of the present invention.

In this case, if the computer program has the functions of a program, the program may be in the form of object code, a program executed with an interpreter, script data supplied to the OS, and so forth.

Examples of recording media for supplying a program include a floppy disk, hard disk, optical disk, magneto-optical disk, MO, CD-ROM, CD-R, CD-RW, magnetic tape, non-volatile memory card, ROM, and DVD (DVD-ROM, DVD-R).

Additionally, a supplying method of the program may be to supply a program by using a browser on a client computer to download from a website on the Internet to a recording medium such as a hard disk. That is to say, the website is accessed, and the computer program itself, or a file according to the present invention that is compressed and includes an automatic install function, is downloaded from the website. Also, the program code making up the program of the present invention can be divided into multiple files, with each file downloaded from different websites. That is to say, a WWW server for downloading a program file as to multiple users in order to realize the functional processing of the present invention with a computer is also included in the scope of the present invention.

Also, the program of the present invention may be encoded and stored in a computer-readable storage medium such as a CD-ROM and distributed to users. A user having cleared predetermined conditions can then download key information to decode the encoding from the website via the Internet. The key information therein can be used to execute the encoded program, thereby installing on the computer and executing.

Also, the computer executes the read out program, whereby the above-described functions of the embodiments can be realized. Additionally, based on the program instructions, the OS operating on the computer and so forth can perform a portion or all of the actual processing, whereby with such processing the above-described functions of the embodiments can be realized.

Further, the above-described embodiment functions can be realized even after the program read out from the recording medium is written into memory provided on a function expansion board inserted in the computer or a function expansion unit connected to the computer. That is to say, based on the program instructions thereof, the above-described functions of the embodiments can be realized by the CPU provided with the function expansion board or function expansion unit performing a portion or all of the actual processing.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

This application claims the benefit of Japanese Patent Application No. 2007-328727 filed Dec. 20, 2007, which is hereby incorporated by reference herein in its entirety.

What is claimed is:

1. An image processing apparatus, which includes an input unit configured to input image data and which communicates with a plurality of external apparatuses via a network, comprising:
    an obtaining unit configured to obtain a document with a predetermined form via the network from one of the plurality of external apparatuses;
    a recognizing unit configured to recognize that the predetermined form described in the document obtained by the obtaining unit is a form to request input of image data;
    a transmitting unit configured to transmit the image data input by the input unit according to instructions from a user based on the predetermined form;
    a determining unit configured to determine whether use of the input unit should be restricted according to transmission destination of the image data transmitted by the transmitting unit, in the case that the recognizing unit recognizes that the predetermined form is a form to request input of image data;
    a control unit configured to restrict use of the input unit, based on determining results by the determining unit,
    wherein the input unit includes at least a mutually different first input unit and second input unit, and
    wherein the determining unit independently determines whether to restrict use of the first input unit and whether to restrict use of the second input unit.

2. The image processing apparatus according to claim 1, further comprising:
    a display unit configured to display a screen corresponding to the document obtained by the obtaining unit,
    wherein the input unit inputs the image data according to instructions from the user via the screen displayed by the display unit.

3. The image processing apparatus according to claim 2, wherein the control unit, in the case determination is made by the determining unit to restrict use of the input unit, in the event of the display unit displaying a screen corresponding to the obtained document, causes the display unit to display a message indicating that use of the input unit is restricted.

4. The image processing apparatus according to claim 1, further comprising:
    a holding unit configured to hold information indicating a transmission destination to restrict use of the input unit;

wherein the determining unit performs the determining, based on information held by the holding unit.

5. The image processing apparatus according to claim 1, further comprising:

an identifying unit configured to identify a user, wherein the determining unit performs the determining, according to the external apparatus serving as a transmission destination for the image data to be transmitted, and according to a user identified by the identifying unit.

6. The image processing apparatus according to claim 1, further comprising:

a reading unit configured to read an image on an original image and output the image data, wherein one of the first input unit and the second input unit inputs the image data output by the reading unit.

7. The image processing apparatus according to claim 1, wherein the external apparatus is a web server; and wherein a document obtained by the obtaining unit is an HyperText Markup Language document provided by the web server; and wherein the display unit is a web browser configured to analyze an HyperText Markup Language document provided from the web server and to display a screen based on the HyperText Markup Language document.

8. A method for controlling an image processing apparatus, which includes an input unit configured to input image data and which communicates with a plurality of external apparatuses via a network, the method comprising:

obtaining a document with a predetermined form via the network from one of the plurality of external apparatuses;

recognizing that the predetermined form described in the document obtained by the obtaining process is a form to request input of image data;

transmitting the image data input by the input unit according to instructions from a user based on the predetermined form;

determining whether use of the input unit should be restricted according to transmission destination of the image data transmitted in the transmitting process, in the case that the recognizing process recognizes that the predetermined form is a form to request input of the image data; and restricting use of the input unit, based on determination results, wherein the input unit includes at least a mutually different first input unit and second input unit, and wherein the determining step independently determines whether to restrict use of the first input unit and whether to restrict use of the second input unit.

9. A computer-readable storage medium having a program stored for causing a computer to execute the method according to claim 8.

* * * * *